United States Patent
Crabb

[11] 3,731,454
[45] May 8, 1973

[54] AUTOMATIC BAGGING MACHINE
[75] Inventor: Jasper R. Crabb, Yakima, Wash.
[73] Assignee: Ag-Pak Inc., Gasport, N.Y.
[22] Filed: Feb. 28, 1972
[21] Appl. No.: 230,163

Related U.S. Application Data

[63] Continuation of Ser. No. 78,762, Oct. 7, 1970, abandoned.

[52] U.S. Cl. .................... 53/55, 53/59 W, 53/63, 53/190, 53/198 A
[51] Int. Cl. ..... B65b 57/04, B65b 57/12, B65b 43/36
[58] Field of Search .................... 53/55, 59 W, 63, 53/190

[56] References Cited
UNITED STATES PATENTS

| | | |
|---|---|---|
| 2,763,458 | 9/1956 | Kindseth..............53/59 W |
| 3,498,020 | 3/1970 | Eppenberger..............53/55 |

Primary Examiner—Travis S. McGehee
Attorney—Robert C. Weber

[57] ABSTRACT

An automatic bagging machine for produce or the like includes bag feeding, holding and tying devices and an electro-pneumatic control system for actuating and deactuating such devices in timed sequence to feed and open the bags to be filled, as well as to close and tie the filled bags. In combination with an automatic weighing machine the two machines are especially adapted to operate together and thereby form an automatic weighing and bagging system, with each machine controlling the operation of the other.

37 Claims, 34 Drawing Figures

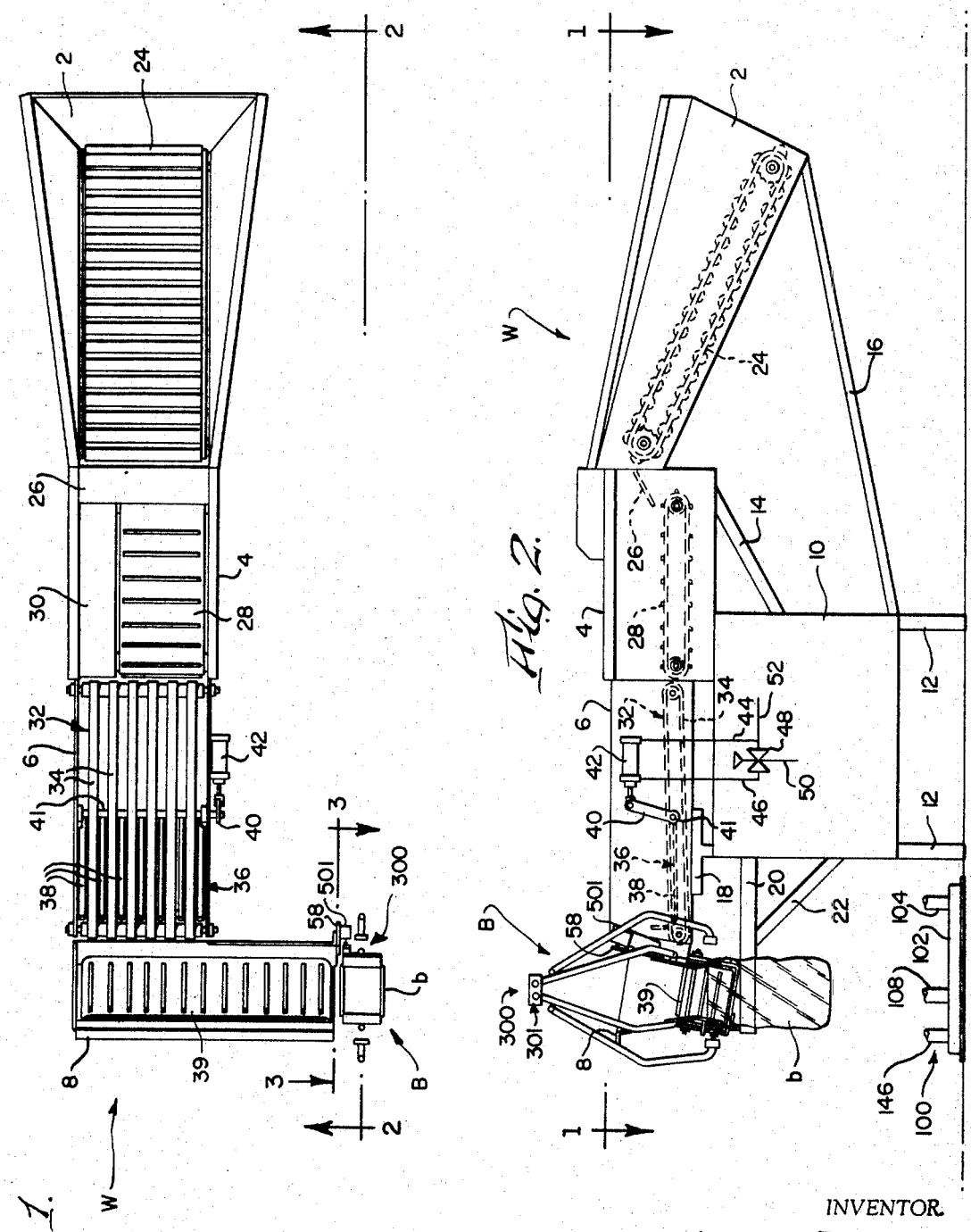

Patented May 8, 1973
3,731,454
10 Sheets-Sheet 2
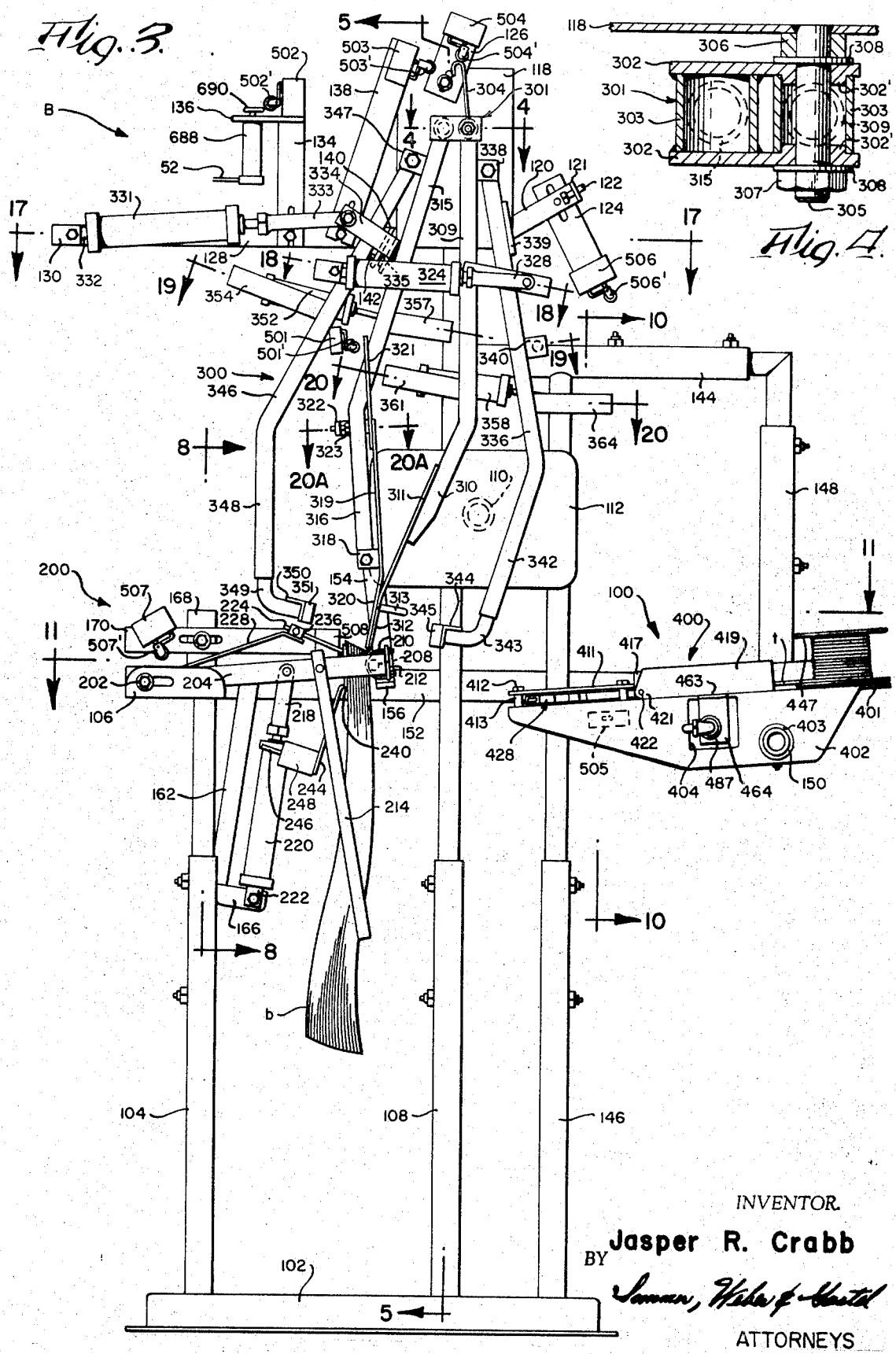
INVENTOR.
Jasper R. Crabb
ATTORNEYS Patented May 8, 1973
3,731,454
10 Sheets-Sheet 3
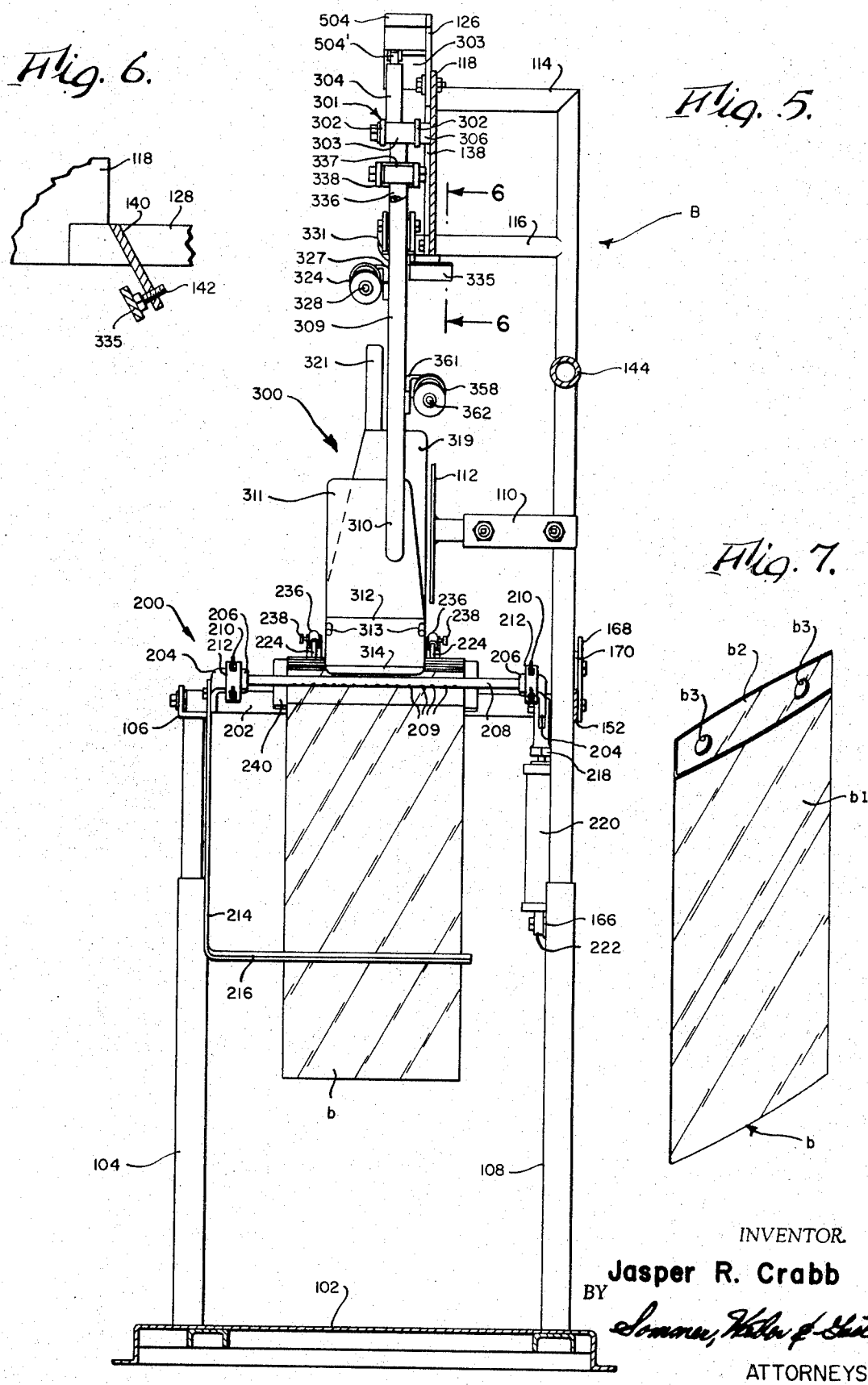

Patented May 8, 1973
3,731,454
10 Sheets-Sheet 4
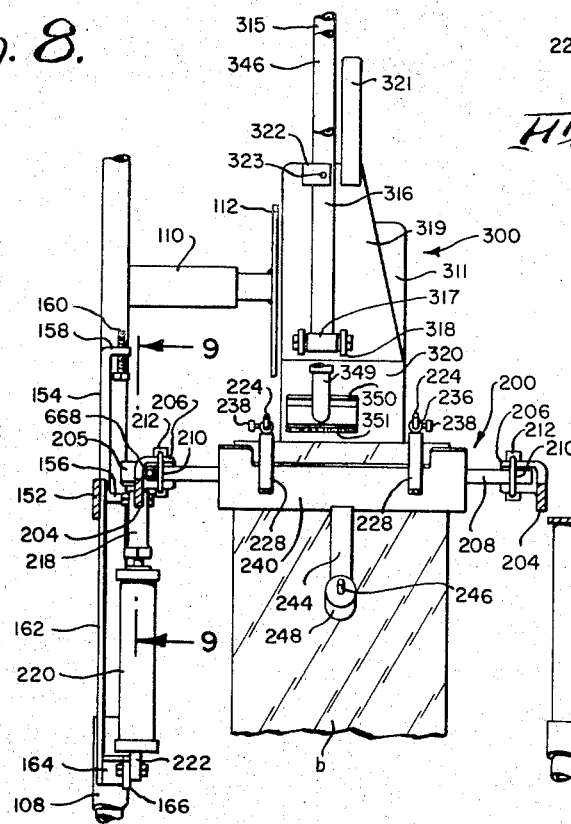
Fig. 8.
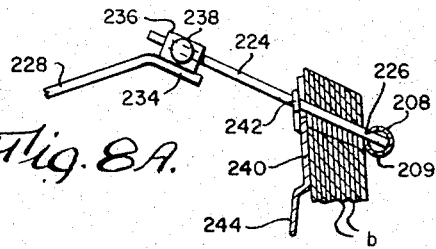
Fig. 8A.
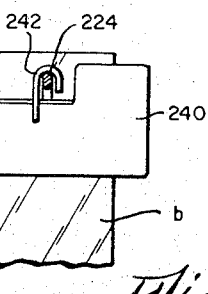
Fig. 8B.
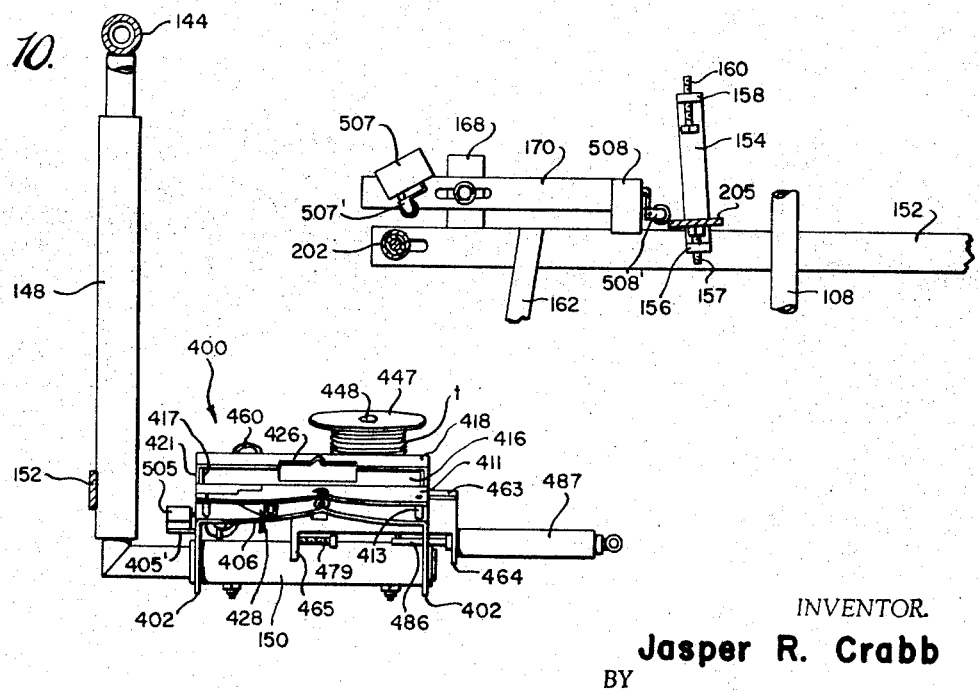
Fig. 9.
Fig. 10.
INVENTOR.
Jasper R. Crabb
BY
*Sommers, Weber & Chatel*
ATTORNEYS

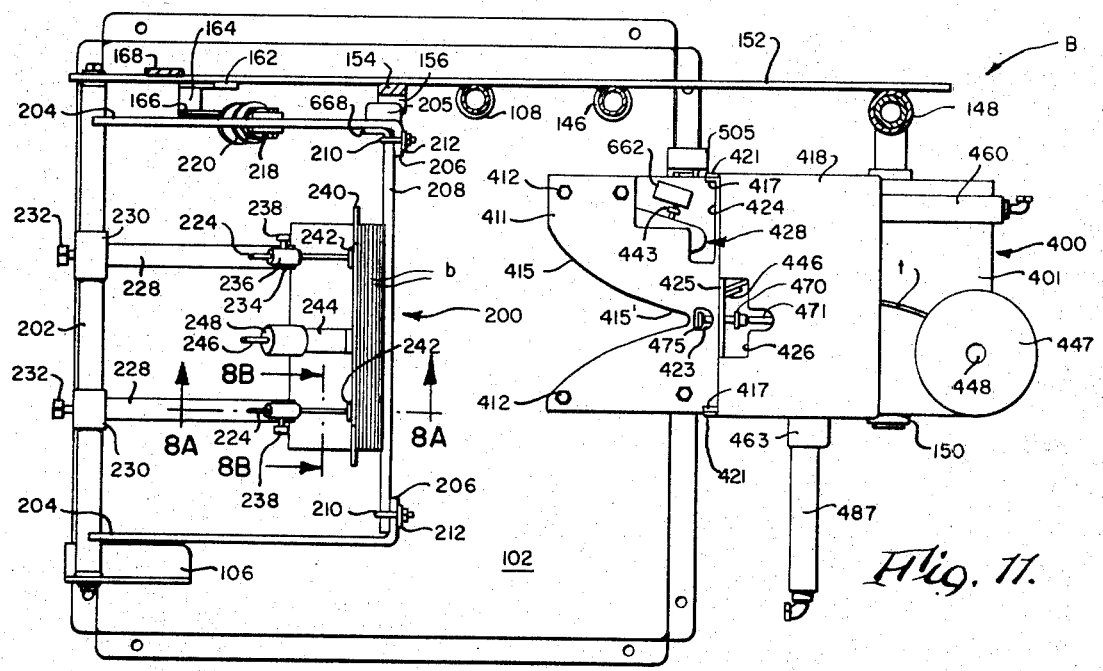
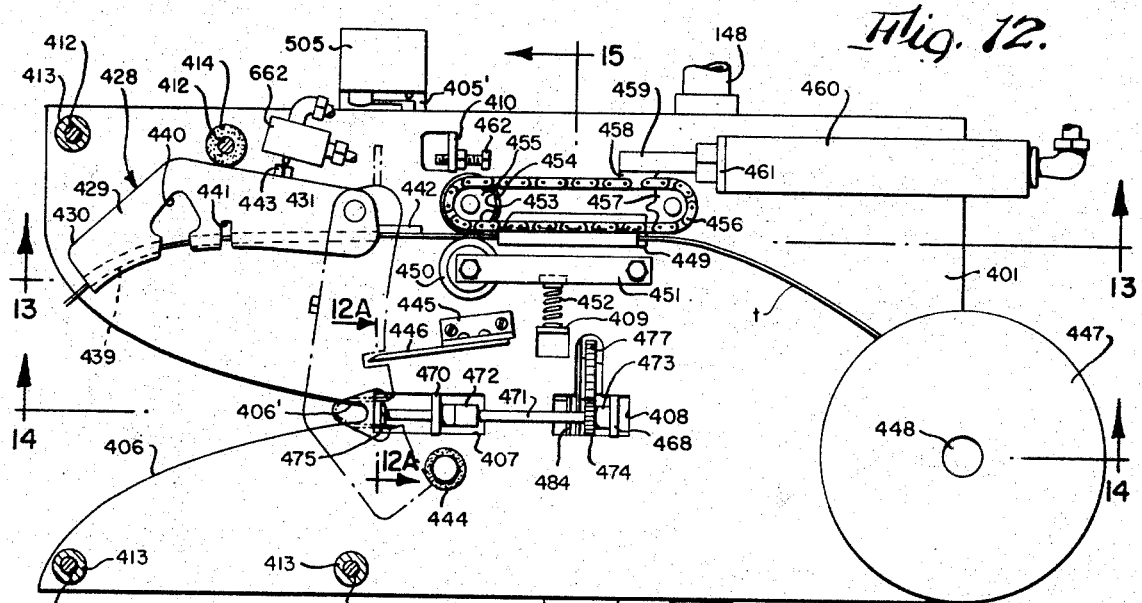
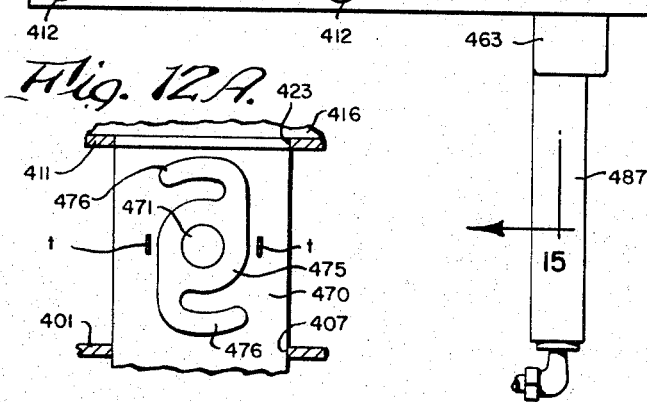

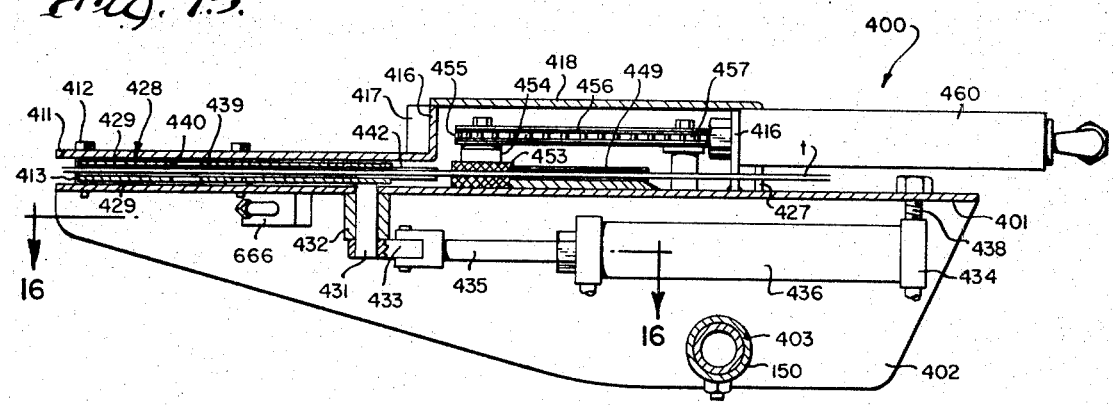
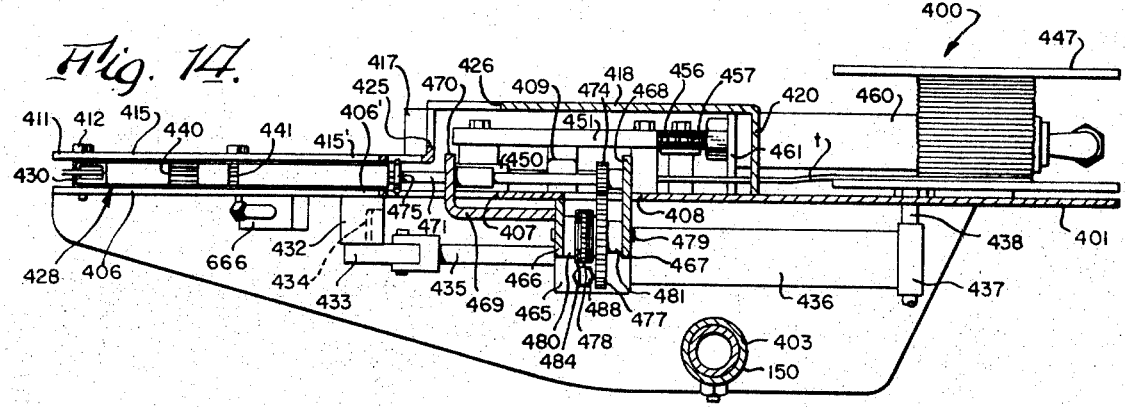
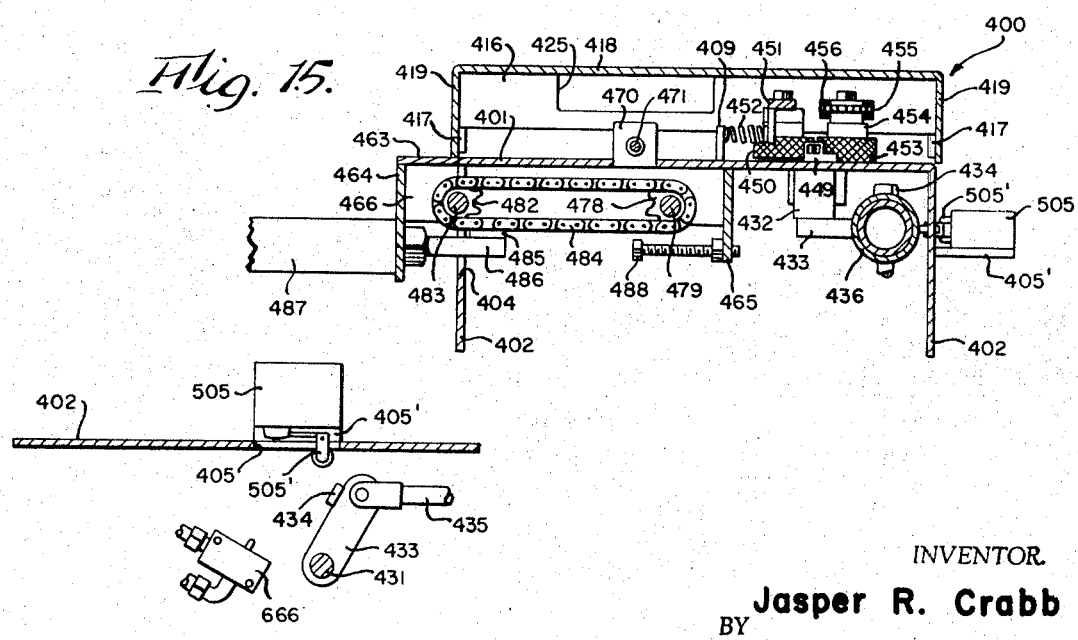

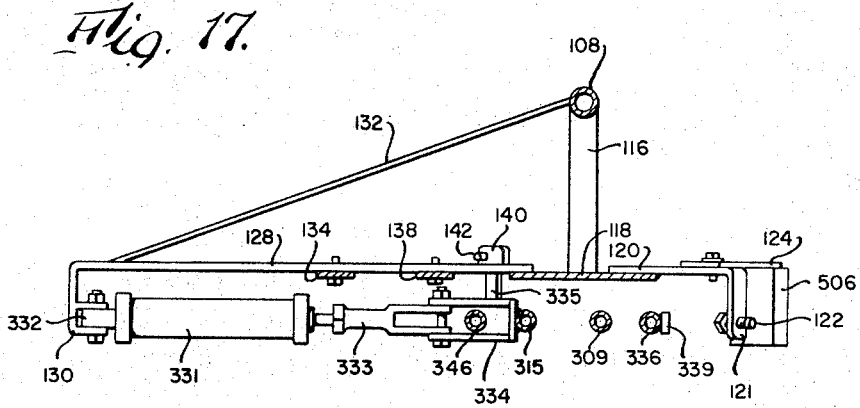
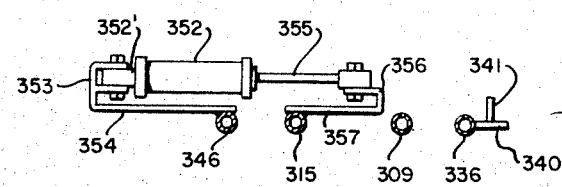
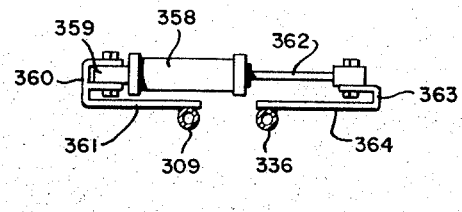
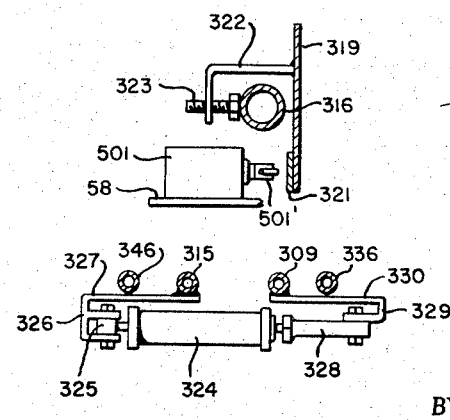

Patented May 8, 1973 3,731,454

INVENTOR.
Jasper R. Crabb
BY

ATTORNEYS

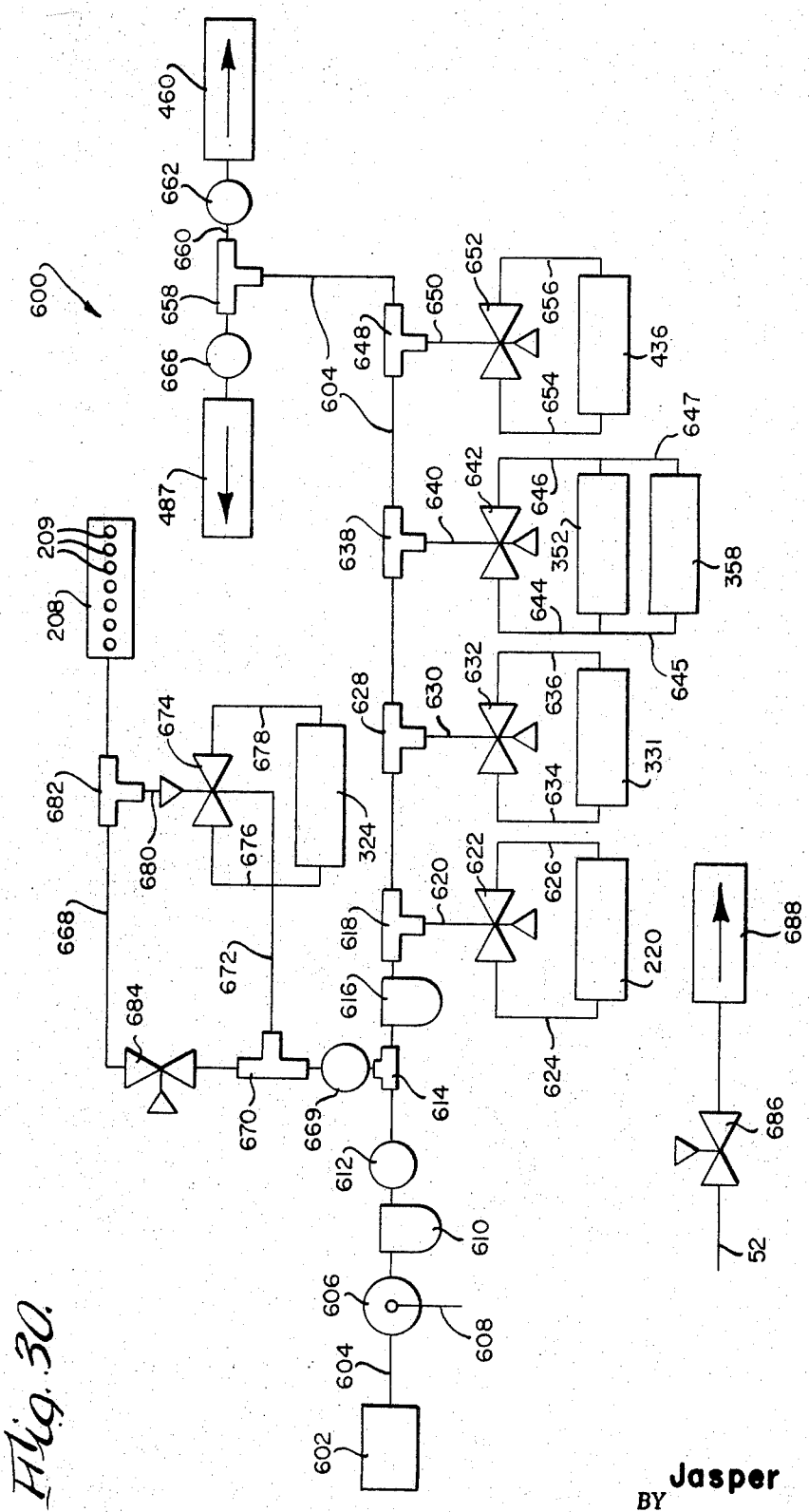

AUTOMATIC BAGGING MACHINE

This application is a continuation of copending application Ser. No. 78,762, filed Oct. 7, 1970, for Automatic Bagging Machine, and now abandoned.

BACKGROUND OF THE INVENTION

1. FIELD OF THE INVENTION

This invention relates to improvements in material weighing and bagging systems, especially for, although not limited to, produce or other heterogeneous commodities (hereinafter produce), and more particularly to a new and improved automatic bagging machine especially adapted for intercontrolled operation with an automatic weighing machine.

2. DESCRIPTION OF THE PRIOR ART

The prior art weighing and bagging of produce usually involves separate weighing, bag filling and bag closing operations performed by separate machines which are not inter-controlled, thereby requiring the use of at least one operator for the weighing and bag filling operations who then manually transfers the filled bags to a bag closing machine. The weighing and bag filling operations normally are performed at one machine, such as disclosed in U.S. Pat. Nos. 2,889,130 and 2,889,131, with an operator being required to manually assist in the weighing operation and to manually manipulate a scoop on the weighing machine to initiate the bag filling operation, whereupon the operator then manually transfers the filled bag to a separate bag tying machine, such as disclosed in U.S. Pat. No. 3,369,573.

SUMMARY OF THE INVENTION

Accordingly, it is a primary object of the present invention to provide a new and improved automatic bagging machine which feeds, opens and holds the open bags for the bag filling operation, upon completion of which such machine closes, ties and releases the filled bags and recycles. To this end such automatic bagging machine includes support means, bag feeding means mounted on such support means, bag tying means mounted on such support means in opposed spaced relationship to such feeding means, bag holding means mounted on such support means between such feeding and tying means and including spreading means, clamping means and swinging means, and an electrical control system for actuating and deactuating such feeding, holding and tying means in timed sequence, such electrical control system including feeder control means energized by such holding means when moved to such feeding means by such swinging means to actuate such feeding means to partially open and feed the partially open end of an empty bag to such spreading means, spreader control means energized and latched by such actuated feeding means to actuate such spreading means to spread open and remove the bag from such feeding means and to deenergize such feeder control means and deactuate such feeding means, clamp control means energized and latched by such deactuated feeding means to actuate such clamping means to clamp the bag against such spreading means prior to the bag filling operation, dual swinger and closer control means simultaneously responsive to completion of such bag filling operation, with such swinger control means being energized and latched to actuate such swinging means to move such spreading and clamping means to such tying means and with such closer control means being deenergized to unlatch such spreader control means and deactuate such spreading means while such clamping means remain actuated to collapse and close such filled bag, tyer control means energized upon such holding means reaching such tying means to actuate such tying means to tie the closed and filled bag, and recycle control means deenergized by such tying means when the bag is tied to simultaneously unlatch such clamp control means and such swinger control means, thereby deactuating and opening such clamping means to release such tied bag, as well deactuating such swinging means to move such holding means from such tying means to such feeding means for reenergizing such feeder control means.

Another primary object of the invention is to provide such automatic bagging machine in combination with an automatic weighing machine, wherein both the weighing and bagging operations are completely automatic, thereby eliminating the need for an operator or manual intervention in the system and maximizing production. To this end, such automatic bagging machine includes time delay means, and the automatic weighing machine includes chute means for delivering a predetermined weight of material to fill the open empty bag, weighing means including conveyor means for delivering the predetermined weight of material to such chute means, movable gate means for restraining the material in such weighing means until such predetermined weight is reached, and electrical control means for automatically determining such predetermined weight of material, for simultaneously actuating such gate means and such time delay means upon such predetermined weight of material being reached to deliver the same to such chute means, and for simultaneously deactuating such gate means and such time delay means upon such delivery to recycle the weighing operation without awaiting completion of the bag filling operation, but with such deactuated time delay means simultaneously energizing and latching such swinger control means and deenergizing such spreader control means only upon completion of such bag filling operation following delivery of such predetermined weight of material to the open bag.

Another primary object of the invention is to provide such combination of automatic weighing and bagging machines wherein the latter controls the bag filling operation even to the point of preventing the former from delivering the predetermined weight of material until an open bag is in proper position and ready to receive the same. To this end, the electrical control system of the automatic bagging machine includes enabling control means energizable by the actuated spreading means upon such bag being spread open to enable the electrical control means of the automatic weighing machine to actuate such gate means as well as disabling control means deenergizable by such actuated spreading means in the event no bag is mounted thereon to prevent such electrical control means of such weighing machine from actuating such gate means notwithstanding subsequent energization of such enabling control means by such actuated clamping means.

Other objects and advantages of the invention will become apparent from the following detailed description and accompanying drawings.

BRIEF DESCRIPTION OF THE DRAWINGS

FIG. 1 is a horizontal section taken on line 1—1 of FIG. 2 to show an automatic produce weighing machine having its lower left end arranged in operative relationship with an automatic bagging machine constituting a preferred embodiment of the invention.

FIG. 2 is a vertical section taken on line 2—2 of FIG. 1 to show both the weighing and bagging machines in greater detail, with portions of the bagging machine being broken away to better illustrate the weighing machine and an open bag in position to be filled.

FIG. 3 is an enlarged front elevational sectional view of the overall bagging machine taken generally along line 3—3 of FIG. 1 to show the supporting framework, and from left to right, the bag feeding device, the bag holding device (including the bag opening, clamping, swinging and closing mechanisms), and the bag tying device.

FIG. 4 is an enlarged fragmentary section taken on line 4—4 of FIG. 3 to show mounting details of the bag holding device.

FIG. 5 is a vertical section taken on line 5—5 of FIG. 3 through the bag holding device.

FIG. 6 is an enlarged fragmentary section taken on line 6—6 of FIG. 5 to show details of the stop structure for limiting return swinging movement of the bag holding device toward the bag feeding device.

FIG. 7 is a perspective view of a plastic produce bag employed in the inventive bagging machine.

FIG. 8 is a fragmentary section taken on line 8—8 of FIG. 3 to show details of the bag feeding and holding devices.

FIGS. 8A and 8B are enlarged fragmentary sections taken respectively on lines 8A—8B of FIG. 11 to show bag mounting details of the bag feeding device.

FIG. 9 is an enlarged fragmentary section taken on line 9—9 of FIG. 8 to show further details of the supporting structure and switches actuated by the bag feeding device.

FIG. 10 is a section taken on line 10—10 of FIG. 3 to show details of the bag tying device.

FIG. 11 is a section taken on line 11—11 of FIG. 3 to show details of both the bag feeding and tying devices.

FIG. 12 is an enlarged top plan view of the bag tying device of FIG. 11, but with covering structure removed to show structural details of the packer arm mechanism on the left, tape feeding mechanism on the right, and tape twisting mechanism therebelow, with the packer arm being shown in its inoperative position in solid lines and in its operative position in dotted lines.

FIG. 12A is an enlarged fragmentary section taken on line 12A—12A of FIG. 12 to show the structure of the twister head of the tape twisting mechanism.

FIG. 13 is a section taken on line 13—13 of FIG. 12 to show further structural details of the tape feeding and packer arm mechanisms.

FIG. 14 is a section taken on line 14—14 of FIG. 12 to show further structural details of the tape feeding and packer arm mechanisms.

FIG. 15 is a fragmentary section taken on line 15—15 of FIG. 12 to show further structural details of the tape twisting and feeding mechanisms.

FIG. 16 is a fragmentary section taken on line 16—16 of FIG. 13 to show details of the lower air switch and the upper electrical limit switch actuated by the packer arm piston rod crank member of the packer arm mechanism.

FIG. 17 is a section taken on line 17—17 of FIG. 3 to show structural details of the bag swinger mechanism.

FIG. 18 is a section taken on line 18—18 of FIG. 3 to show structural details of the mechanism for actuating the bag opening or spreader arms.

FIG. 19 is a section taken on line 19—19 of FIG. 3 to show structural details of the mechanism for actuating the left or trailing bag clamping arm and switch actuating structure on the right or leading bag clamping arm.

FIG. 20 is a section taken on line 20—20 of FIG. 3 to show structural details of the mechanism for actuating the right or leading bag clamping arm.

FIG. 20A is a section taken on line 20A—20A of FIG. 3 to show details of the stop structure for limiting pivotal movement of the left or trailing spade on its arm for actuating a safety switch on the weighing machine to enable feeding produce to the bagging machine.

FIG. 21 shows the bag feeding, holding and tying devices prior to the start of a cycle.

FIG. 22 shows the rocker arm mechanism of the bag feeding device positioning the partially inflated, elected bag over the spades on the spreader arms of the bag holding device.

FIG. 23 shows the spreader arms and spades holding the selected bag in fully opened position.

FIG. 24 shows the clamp arms of the bag holding device contracted to clamp the bag against the spades.

FIG. 25 shows the bag being filled with produce.

FIG. 26 shows the bag being closed by the contracted spreader and clamp arms as it is moved toward the tying device.

FIG. 27 shows the closed bag positioned in and being tied by the tying device.

FIG. 28 shows the tied bag when released from the holding and tying devices onto a conveyor belt.

FIG. 30 is a schematic diagram of the pneumatic control system for the bagging machine.

DESCRIPTION OF THE PREFERRED EMBODIMENT

Introduction

Figure 21:
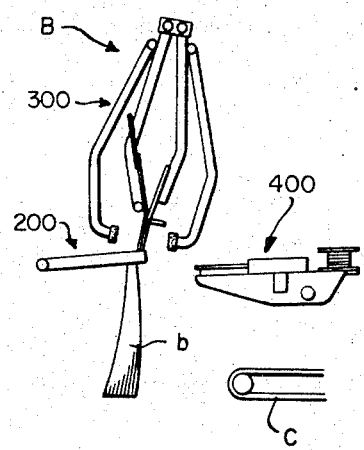
FIGS. 21-28 are fragmentary elevational sectional views similar to FIG. 3 but on a substantially reduced scale and with parts removed in order to show the sequence of operations in a cycle of the bagging machine.

Referring to the drawings, and particularly FIGS. 1 and 2, the automatic bagging machine constituting a preferred embodiment of the invention is generally designated at B and is shown in operative relationship with an automatic produce weighing machine generally indicated at W. In the operative relationship shown, each machine is particularly adapted for joint inter-controlled operation with the other, and this is the preferred arrangement. However, it is to be understood that each machine may be operated independently. For example, weighing machine W may be used to fill bags with produce directly by being equipped with a discharge scoop (not shown) over which the open empty bags are manually positioned for the bag filling operations, such as disclosed in U.S. Pat. Nos.

2,889,130 and 2,889,131. Likewise, automatic bagging machine B could be employed with those patented weighing machines or any other suitable weighing machine for the bag filling operation.

Weighing Machine

While the precise details of weighing machine W, per se, are not necessary to an understanding of the present invention, a brief general description of the structure and operation thereof will be given in view of its adaptation for use with automatic bagging machine B. Hence, as shown in FIGS. 1 and 2, weighing machine W includes an upwardly inclined produce supply hopper 2, a fast feed housing 4, a weighing compartment 6 and a discharge housing 8, all arranged in sequence from right to left. The delivery end of feed housing 4 is suitably mounted on the upper end of a box-like support cabinet 10 having depending legs 12, with the cantilever entrance end of housing 4 being supported by one or more inclined struts 14 extending from cabinet 10. The upper delivery end of supply hopper 2 is suitably supported at the upper entrance end of feed housing 4 in communication therewith, while the lower end of hopper 2 is supported by one or more inclined struts 16 extending outwardly from cabinet 10. Weighing compartment 6 is suitably supported for vertical movement with respect to cabinet 10 on a member 18 which constitutes the commodity outrider of a suitable beam type weighing mechanism (not shown), but which may be the same as or similar to the weighing mechanisms disclosed in the above patents. Next, discharge chute or housing 8 is arranged transversely at the outer end of weighing compartment 6 and is suitably supported to incline downwardly and outwardly to one side from the delivery end of weighing compartment 6 by frame work including depending legs (not shown) supported by one or more cantilever beams 20 and inclined struts 22 projecting from the front or left end of cabinet 10. As will be evident from FIGS. 1 and 2, both ends of feed housing 4 and weighing compartment 6 are open, with their adjacent ends in communication with each other, while the entrance end of housing 4 communicates with the open upper delivery end of hopper 2 and the delivery end of weighing compartment 6 communicates with an opening in the upper adjacent side of discharge chute 8, all for the proper feeding, weighing and discharging the produce. However, while both hopper 2 and feed housing 4 are stationary, as is discharge chute 8, weighing compartment 6 is arranged to move vertically with respect to both housing 4 and chute 8 by reason of its mounting on member 18 and its associated weighing mechanism.

A power driven supply conveyor 24 is suitably arranged in hopper 2 for feeding the produce upwardly over a baffle plate 26 into feed housing 4 containing a power driven, fast feed conveyor 28 and a vibratory platform 30. Most of the produce is deposited on conveyor 28, while a minor portion thereof is deposited on platform 30. As the produce is fed from conveyor 28 to a power driven weighing conveyor 32 suitably mounted in weighing compartment 6, the weighing compartment descends until slightly under the desired weight is reached, at which time fast feed conveyor 28 is stopped, while the vibratory plate 30 is actuated to bring the weight to the predetermined amount desired, by dribbling produce to weighing conveyor 32 in small amounts, at which time it also stops.

As will be evident from FIG. 1, weighing conveyor 32 includes a plurality of transversely spaced belts 34 which are arranged close enough together to prevent the produce from falling therethrough, but far enough apart to permit the hook members 38 of a multiple hook gate mechanism 36 to extend upwardly above conveyor 32 and restrain the produce from entering discharge housing 8 until weighing compartment 6 is up to weight. Once this occurs, gate 36 is tripped or dropped to a position below conveyor 32 in any suitable manner so that the produce can enter discharge housing 8 and be deposited on a power driven conveyor 39 suitably mounted therein for filling open bag b in bagging machine B.

This may be accomplished by a lever or crank 40 having its lower end fixed to a common transverse shaft 41 rotatably mounted in compartment 6 and fixed to the rear ends of hook members 28, with its upper end operatively connected to the piston of a two-way air motor 42 suitably mounted on the outside of compartment 6 and operated through fluid lines 44,46 by a solenoid-actuated four-way air valve 48 supplied through a line 50 from a suitable compressed air source (not shown) and also provided with a line 52 leading to automatic bagging machine B for a purpose to be described below. As will be evident from FIG. 2, during the power stroke of motor 42 the compressed air flows through line 50, valve 48 and line 44 to the inlet of motor 42 with line 46 being connected to exhaust, thereby causing its piston to extend to the left and pivot lever 40 to drop hook members 38 of gate 36 below conveyor 32. At the same time, air flows through line 52 to bagging machine B. During the exhaust or return stroke of motor 42, the flow is reversed to return lever 40 and hook members 38 of gate 36 to the upper restraining position shown.

This action of gate 36 is controlled in any suitable manner so that gate 36 will remain tripped or depressed until all of the produce on weighing conveyor 32 has been fed to discharge housing 8 and conveyor 39. Preferably, this is accomplished by the aforesaid weighing mechanism which actuates an electrical control system schematically shown in FIG. 29 at 54 which not only controls the starting and stopping of conveyor 28 and platform 30, but also energizes control solenoid 56 to actuate valve 48 for the power stroke of motor 42. This electrical control system contains a time delay relay (not shown) so that after a predetermined period of time during which all the produce clears depressed gate 36 and weighing conveyor 32 and compartment 6 return to the unloaded position shown, solenoid coil 56 will be de-energized, thereby reversing valve 48 and the air flow through motor 42 to return lever 40 and hook members 38 of gate 36 to their restraining positions shown, while at the same time restarting fast feed conveyor 28. Except as set forth below, supply conveyor 24, weighing conveyor 32 and discharge conveyor 39 are continuously driven by such electrical control system 54 for each successive weighing operation. However, if for some reason, gate 36 is prevented from tripping or dumping, say be bagging machine B, should a bag b not be in the desired position shown in FIG. 2, then supply conveyor 24 also will be stopped by electrical control system 54, so as to avoid overloading fast feed conveyor 28 and vibratory platform 30. For this purpose, part of the electrical control system of bagging machine B in the form of limit switch 501 is mounted on a bracket 58 extending laterally from the lower end of discharge chute 8, as shown in FIG. 1, and will be described in detail below.

The aforedescribed operation of automatic weighing machine W is quite similar to that described in the above mentioned patents, with the principal exceptions that the produce load on weighing conveyor 32 is brought up to the desired weight automatically by vibrating platform 30, instead of manually, that automatic bagging machine B of the invention is provided with an electrical control system (to be described below) for controlling the tripping of gate 36 instead of the bag filling scoops disclosed in such patents, and that the tripping of such gate in turn controls the operation of bagging machine B, as will be described in detail below.

AUTOMATIC BAGGING MACHINE

General

The inventive automatic bagging machine B is illustrated in detail in FIGS. 3–30 of the drawings, and referring particularly to FIG. 3, bagging machine B is generally composed of a supporting framework 100, a bag feeding device or mechanism 200, a bag holding device or mechanism 300 and a bag tying device or mechanism 400. The electro-pneumatic control system for the machine includes the electrical control circuitry 500 shown in FIG. 29 and the fluid control circuitry 600 shown in FIG. 30.

Framework

Continuing with FIG. 3, framework 100 for bagging machine B includes a variety of supporting members and brackets which are preferably made of metal and welded together, unless otherwise specified. Likewise, a number of these members, particularly the below described leg and arm members are longitudinally adjustable by any suitable means, such as the set screws and nuts shown thereon, while a number of brackets are likewise adjustably mounted by means of nuts and bolts, most of which screws, nuts and bolts are not numbered for simplicity of description.

Thus, framework 100 includes a generally rectangular, reinforced raised base or platform 102 on which is mounted an adjustable front vertical tubular leg 104 provided with an L-shaped bearing plate 106 which is slotted for rotatably supporting the rocker structure of bag feeding device 200. At the rear of platform 102 is mounted a central adjustable vertical tubular leg 108 which is provided with a horizontal and forwardly extending, adjustable arm 110 (FIG. 5) supporting a vertical transverse, rectangular plate 112 which acts as a buffer for the produce as it is being emptied into bag $b$. At its upper end, leg 108 terminates in a horizontal and forwardly extending arm 114 which, together with a like lower tubular arm 116 support a vertical transverse, rectangular plate 118 for mounting various brackets and the bag holding device or mechanism 300. As also seen in FIG. 17, the rear of plate 118 is provided at its lower right end with an upwardly and outwardly inclined bracket 120 having an outstanding flange 121 supporting an adjustable stop screw 122 for limiting movement of bag holding device 300 toward bag tying device 400. Also adjustably mounted on bracket 120 is a downwardly and outwardly extending bracket 124 for supporting one-way limit switch 506. As best shown in FIG. 3, an upwardly extending bracket 126 is adjustably mounted on the upper front end of mounting plate 118 for supporting limit switch 504. Continuing with FIGS. 3 and 17, an elongated horizontal bracket 128 extends outwardly to the left from the lower rear side of plate 118, and its outer or left end is provided with a reentrant yoke 130, for pivotally supporting air motor 331 of bag holding device 300. Bracket 128 is reinforced by a strut 132 secured to its outer rear end and central vertical leg 108. To the right of yoke 130 and adjustably mounted on the front of bracket 128 is an upwardly extending bracket 134 which supports one-way limit switch 502 and is provided with a horizontal flange 136 for supporting time delay air motor 688 for controlling movement of bag holding device 300. To the right of bracket 134 another upwardly inclined bracket 138 is adjustably mounted on the front of horizontal bracket 128 for supporting limit switch 503, and to the right of bracket 138 but extending from the rear side of bracket 138 is a short, inclined bracket 140 supporting an adjustable stop screw 142 (as best seen in FIGS. 6 and 17) for limiting return movement of bag holding device 300 from bag tying device 400 to bag feeding device 200.

Returning to FIG. 3, central vertical leg 108 is provided below mounting plate 118 with a transverse horizontal adjustable tubular arm 144 which is reinforced by an outer vertical adjustable tubular leg 146 extending upwardly from base 102 and which terminates at its outer or right end in a vertically adjustable, tubular down leg 148, which is provided (FIGS. 10 and 11) with a forwardly extending, horizontally adjustable tubular leg 150 for supporting bag tying mechanism 400.

As best seen in FIGS. 3 and 11, an elongated and horizontal, transverse reinforcing bar 152 is secured across the rear of legs 108, 146 and 148 to reinforce the framework and to provide a support for the following brackets. Just to the left of leg 108 (FIG. 9) bar 152 is provided with an upwardly extending dual stop bracket 154 which is provided with a forwardly extending lower flange 156 having an adjustable screw 157 forming a lower stop for the rocker structure of bag feeding device 200 and at its upper end with a like flange 158 mounting an adjustable screw 160 which forms an upper stop for such rocker structure.

To the left of bracket 154 is a downwardly depending bracket 162 secured to the front side of bar 152, and as shown in FIGS. 3, 8, and 11, bracket 162 terminates in a forwardly extending flange 164 to which is secured a downwardly inclined bracket 166 for pivotally supporting air motor 220 of the rocker arm structure of bag feeding device 200. To the left of bracket 162 (FIGS. 3 and 9) and secured to the rear side of bar 152 is an upstanding bracket 168 adjustably supporting an elongated horizontal bracket 170 which supports limit switch 507 at its left end and one-way limit switch 508 at its right end, both actuated by such rocker structure for controlling the operation of bag holding device 300. At its outer left end (FIG. 9) bar 152 is slotted in the same manner as bearing plate 106 (FIG. 3) for adjustably rotatably supporting such rocker structure.

Bag Feeding Device

The bag feeding device or mechanism is generally indicated at 200 and is illustrated in FIGS. 3, 5, 7-9 and 11. As best seen in FIGS. 3, 5, and 11, mechanism 200 includes a rotatable shaft structure 202 adjustably mounted in the slots in bearing plate 106 and bar 152 (FIG. 9). Fixed to shaft 202 are front and rear rocker arms 204 extending inwardly or to the right toward the center of frame 100 and terminate at their outer ends in inturned flanges 206 connected by an elongated air blast tube 208 having perforations 209 in its lower surface (FIGS. 5 and 8A) to initiate the bag opening operation as will be described in detail below. Tube 208 is secured to flanges 206 by U-bolts 210 and straps 212 with the front end of tube 208 being closed and its rear end connected by line 668 to a suitable compressed air source 602 (FIG. 30) as will be described in greater detail below.

As shown in FIGS. 3 and 5, front rocker arm 204 is provided with a downwardly depending bale 214 pivotally mounted at its upper end and terminating at its lower end in a rearwardly extending horizontal arm 216 for restraining the lower ends of bag b to prevent swinging thereof and interference with the bag filling operation to be described below. Intermediate its inner and outer ends rear rocker arm 204 has pivotally mounted thereon the upper end of a piston rod 218 of an air motor 220 having a lower extension 222 pivotally mounted on bracket 166 for rocking or oscillating rocker arms 204 upwardly and downwardly about the axis of shaft structure 202 for the bag feeding and opening operations. Rear rocker arm is in line with the roller-carrying contact arm 507' of switch 507 for actuating the same on the way up, and is provided at its right end with a rearwardly extending flange 205 (FIGS. 8 and 9) for engagement with lower and upper stops 157,160 to limit oscillation of the rocker structure and for actuating one-way switch 508 by engagement with its roller-carrying contact arm 508', but only on the down stroke of the rocker structure. Although flange 205 does engage switch arm 508' on the way up, the latter collapses instead of closing the switch contacts, and as flange 205 rises past arm 508' it is spring-biased back to the position shown for contact closing action when re-engaged by flange 205 on the down stroke.

Referring now to FIG. 7, each bag b preferably is made of polyethylene and is composed of a front side b1 and a longer rear side b2 which extends above the upper end of the front side and is provided with transversely spaced through holes or openings b3. These bags b1 are normally provided in stacks of up to about 500 (only a few of which are shown) pre-mounted on rods or wires 224 (FIGS. 3 and 8A) such bags and rods being mounted on the bag feeding mechanism 200 by the following structure.

As illustrated in FIGS. 8A and 11, air blast tube 208 has its inner side provided with spaced holes 226 corresponding to holes b3 of bags b to receive the outer ends of rods 224, the inner or left ends of which are supported by the following structure. A pair of upwardly inclined bars or straps 228 are provided at their inner ends with transverse collars 230 mounted over shaft 202 and adjustably fixed thereto by means of set screws 232. The downwardly inclined right ends 234 of bars 228 are provided with longitudinal collars 236 to slidably receive the inner or left ends of rods 224, the positions of which may be adjustably fixed by set screws 238.

For installation of an assembly of rods 224 and bags b, it will be assumed that the support bars 228 are swung upwardly out of operative position, whereupon the right ends of rods 224 are inserted into holes 226 in tube 208 until they engage the inner periphery of tube 208, whereupon support arms 228 are swung back into operative position so that collars 236 receive the left ends of rods 224, whereupon the set screws 232 and 238 are tightened to fix rods 224 and supporting bars 228 in the operative position shown, wherein the rods are inclined downwardly to the right, there being sufficient clearance between rods 224 and the walls forming holes 226 in bar 208 to permit pivoting of the rods to facilitate insertion into collars 236. The inclination of rods 224 facilitates feeding of the bags which are kept in closely stacked relationship by the following structure.

As best seen in FIGS. 3, 8, 8A, 8B and 11, an elongated rectangular feed plate 240 is provided on its left side with upstanding hooks 242 which are designed to fit over rods 224 after their assembly in collars 236, and at its central bottom portion feed plate 240 is provided with a depending strap 244 inclined slightly to the left and terminating with an upwardly inclined rod or tine 246 on which is slidably mounted a cylindrical counterweight 248 which acts to maintain feed plate 240 and the upper ends of bags b in a generally vertical position, despite the inclination of rods 224, in order to facilitate the bag opening operation. Thus, bags b are fed by gravity feed plate one by one to bag holding device 300.

Bag Holding Device

Figure 22:
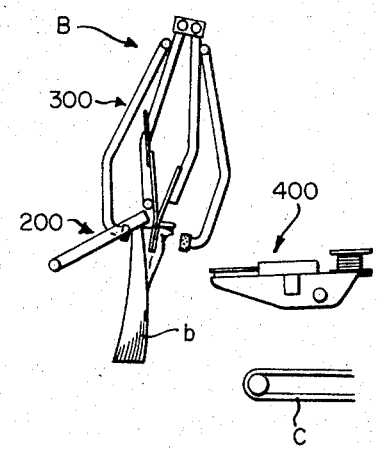
Figure 23:
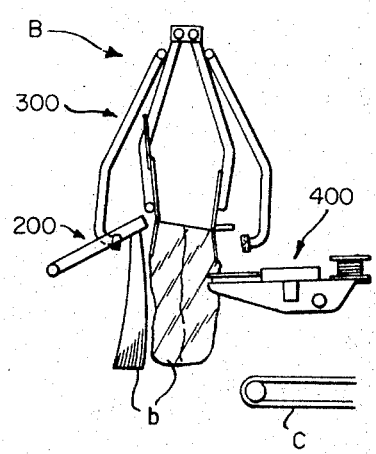
Figure 24:
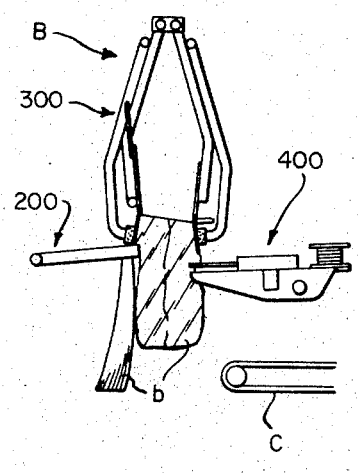
Figure 25:
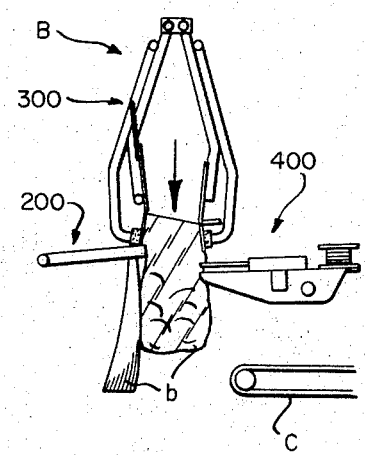

The bag holding device or mechanism 300 is illustrated in FIGS. 3-6, 8, 17-20A and 21-28. This mechanism actually removes bag b from bag feeding device 200 (FIGS. 21 and 22), and spreads and clamps the bag in open position for the bag filling operation (FIGS. 23-25). When the bag is filled, this mechanism closes the filled bag and transfers the same to tying mechanism 400 (FIGS. 26,27) and following which operation the tied bag is released by such holding mechanism (FIG. 28), which returns for a repeat cycle.

Referring now to FIGS. 3 and 4, bag holding mechanism 300 is suspended from mounting plate 118 on frame work 100 by a mounting bracket structure 301 composed of front and rear rectangular plates 302 spaced and connected by left and right sleeves 303. Left sleeve 303 is welded to plates 302 while right sleeve 303 swivels on internal bosses 302' and is provided on its upper surface with an upstanding hook arm 304 (FIGS. 3 and 5) adapted to selectively actuate limit switches 504 and 503 respectively by engagement with their roller-carrying contact arms 504' and 503'. The right hand portions of plates 302 and bosses 302' are perforated to receive a stub shaft 305 which is welded in and extends horizontally forwardly from mounting plate 118 with its front end having exterior threads. Mounting bracket structure 301 thus is oscillatable about the axis of stub shaft 305 and is spaced from mounting plate 118 by a rear spacer sleeve 306 with a nut 307 threaded over the outer end of shaft 305 securing such bracket structure in place, while washers 308 are sandwiched between plates 302 and sleeve 306 and nut 307 respectively to facilitate the desired oscillation. Hence, as will be referred to in greater detail below, bag holding mechanism 300 pivots about a single axis, with right sleeve 303 being independently pivotable with respect to bracket structure 301.

Bag Spreading Structure

Continuing with FIG. 3, the structure for spreading each bag b includes a leading tubular spreader arm 309 having its upper end welded to the lower surface of the right hand mounting sleeve 303 for oscillation therewith and depends downwardly to a backwardly inclined lower end portion 310 to the inner side of which is welded an elongated and generally rectangular bag spreading spade 311 having a slightly forwardly bent lower portion 312 provided with forwardly extending stops 313 (FIG. 5) for limiting the upward movement of each bag b when inserted over such lower end portion 312, which terminates at its bottom with a rounded and tapered edge portion 314 to facilitate entry into bag b. The upper end of trailing tubular spreader arm 315 is likewise welded to the under surface of left sleeve 303 and is inclined downwardly and backwardly to a slightly forwardly bent depending lower portion 316 provided at its lower end with a transverse horizontal sleeve 317 (FIG. 8) pivotally mounted in a yoke bracket 318 welded to the rear of trailing spade 319, the lower end portion 320 of which is bent slightly backwardly and is rounded like lower leading spade portion 320 but terminates slightly above tapered lower edge portion 314 of the latter. At its front upper end portion trailing spade 319 is provided with an upwardly extending arm or tab 321 for actuating switch 501 by engagement with its roller-carrying arm 501', and as shown in FIG. 20A, the upper rear end portion of spade 319 is provided with a backwardly extending, L-shaped bracket 322 carrying a stop screw 323 for limiting the pivotal movement of spade 319 relative to spreader arm 315, all for proper actuation of such switch, as will be described below.

Relative movement of leading spreader arm 309 toward an away from trailing spreader arm 315 is controlled by the structure illustrated in FIG. 18 and which includes air motor 324 having a rear extension 325 pivotally mounted in a reentrant yoke 326 of bracket 327 welded to the front side of trailing spreader arm 315. Motor 324 is provided with a forwardly extending piston rod extension 328 which is pivotally mounted to reentrant flange 329 on bracket 330 likewise welded to the front of leading spreader arm 309.

Swinging Structure

The structure for swinging bag holding mechanism 300 from the position shown in FIG. 3 toward typing device 400 is illustrated in FIGS. 3 to 17 as including air motor 331 having a rear extension 322 pivotally mounted in yoke 130 on mounting plate 118. Motor 331 is provided with a forward piston rod extension 333 which is pivotally mounted in a U-shaped bracket 334, the closed end of which is welded to the back side of trailing spreader arm 315. The rear arm leg or flange of bracket 334 is provided with a rearwardly extending flange 335 which, as best shown in FIG. 6, is engageable with adjustable stop screw 142 on inclined flange 140 secured to supporting bracket 128, all to limit the return movement of bag holding mechanism 300 to the position shown in FIG. 3.

Bag Clamping Structure

Figure 27:
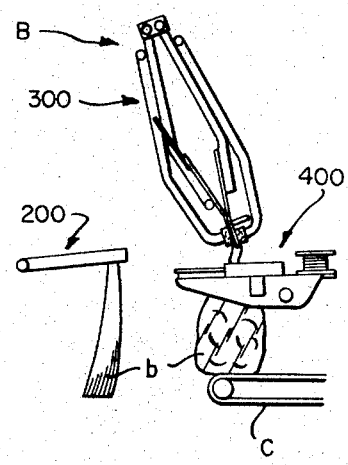

As best shown in FIGS. 3 and 5, the bag clamping structure which is operatively associated with the bag spreading structure, includes a leading depending tubular clamp arm 336 which is provided at its upper end with a transverse sleeve 337 (FIG. 5) pivotally mounted in a yoke bracket 338 welded to the outer or leading side of leading spreader arm 309 adjacent the upper end thereof. Spaced a short distance below bracket 338 and welded to the leading side of clamp arm 336 is a plate 339 adapted to engage adjustable stop screw 122 on bracket 120 for limiting the forward movement of bag holding mechanism 300 as its positions the filled bag within tying mechanism 400 (FIG. 27). Spaced below plate 339 and welded to clamp arm 336 is a forwardly extending bracket 340 having a rearwardly extending rod 341 (FIG. 19) which is adapted to engage roller-carrying contact arm 506' of one-way limit switch 506 mounted on bracket 124. Rod 341 only actuates switch 506 momentarily as it engages arm 506' as bag holding device is swung to tying device 400 and passes arm 506' when plates 339 engages stop 122. On return movement of bag holding device to the position of FIGS. 3 and 21, rod 341 wipes switch arm 506' which collapses instead of actuating switch 506 and then springs back to the FIG. 3 position, in the same manner as described above for one-way switch 508. Continuing with FIG. 3, clamp arm 336 is provided with a rearwardly inclined lower portion 342 terminating at its lower end in a rearwardly extending elbow 343 provided with an inverted L-shaped flange 344 to the rear vertical side of which is adhered a resilient clamping member 345 made of suitable material such as rubber or the like.

The depending trailing clamp arm 346 is provided at its upper end with a transverse sleeve (not shown) like sleeve 337 and is suitably secured in a yoke bracket 347 welded to the rear side of trailing spreader arm 315 adjacent the upper end thereof. As will be evident from FIG. 3, trailing clamp arm 346 is inclined downwardly and rearwardly to a substantially vertical lower end portion 348 terminating in a forwardly extending elbow 349 provided with an inverted L-shaped flange 350 having adhered to the vertical leg thereof a resilient clamping member 351 like member 345.

The relative movement between trailing spreader arm 315 and trailing clamp arm 346 is controlled by the structure illustrated in FIGS. 3 and 19. This structure includes air motor 352 having a rear extension 352' pivotally mounted in yoke 353 of bracket 354 welded to the rear of trailing clamp arm 346. At its forward end, motor 352 is provided with a piston rod extension 355 which is pivotally mounted on a reentrant flange 356 of bracket 357 which likewise is welded to the rear of trailing spreader arm 315. The relative movement between leading clamp arm 336 and leading spreader arm 309 is controlled by similar structure which is shown in FIG. 20. This structure includes air motor 358 provided with a rear extension 359 pivotally mounted in yoke 360 of bracket 361 welded to the rear of leading clamp arm 309. A piston rod extension 362 extends forwardly from air motor 358 and is pivotally mounted on reentrant flange 363 of bracket 364 likewise welded to the rear of leading clamp arm 336.

Bag Tying Device

The bag tying device or mechanism is shown in FIGS. 3 and 10-16 and is generally indicated at 400.

Housing Structure

Referring particularly to FIGS. 3, 11 and 12, the housing structure of this device includes an elongated platform 401 inclined slightly downwardly to the left and provided with depending front and rear flanges 402 having aligned front and rear openings 402 receiving adjustable horizontal tubular leg 150 suitably welded to the flanges. As seen in FIG. 3, front flange 402 is provided with a rectangular opening 404 for passage of part of the tape twisting mechanism to be described below, while rear flange 402 is provided with a rectangular opening 405 (FIG. 16) and a rearwardly extending flange 405' for support of and access to a one-way electrical limit switch 505 having a collapsible roller-carrying arm 505', like switches 506 and 508.

As best seen in FIG. 12, platform 401 is provided at its left end with a concavely curved and generally V-shaped bag receiving slot 406 terminating in a narrow closed throat portion 406'. Just to the right of the throat portion, platform 401 is provided successively with an elongated rectangular slot 407 and an inverted T-shaped slot 408 for portions of the tape twisting mechanism. Likewise, to the rear of slot 408, platform 401 is provided with an upstanding longitudinal ear or tab 409 which is struck out for supporting part of the tape feeding mechanism to be described below, and to the rear of this tab 409 is an upstanding transverse tab 410 likewise struck out for supporting another part of such tape feeding mechanism.

Such housing structure is provided at its left end with a cover plate 411 (FIG. 11) which is mounted above and in spaced relationship to the left end portion of platform 401 by means of four bolts 412, three of which are provided with metallic spacer sleeves 413, with the right rear bolt 412 being provided with a resilient rubber or the like spacer sleeve 414 which also acts as a rear stop for the packer arm mechanism to be described below. Cover plate 411 also is provided with a curved entrance slot 415 having a reduced throat portion 415' at its closed end, each matching slot 406 and throat portion 406' respectively in platform 401. At its right end, cover plate 411 is provided with an upstanding flange 416 (FIG. 13) having reversely bent ears or lugs 417 at its front and rear sides. As shown in FIGS. 11 and 13-15, there is supported upon flange 416 the upper or top wall 418 of a raised cover member including front and rear side walls 419 and a right end wall 420 supported on platform 401. As best seen in FIG. 3, the left end portions 421 of side walls 419 extend over ears 417 and are removably secured thereto by any suitable means such as bolts 422. Returning to FIG. 11, cover plate 411 additionally is provided with a small central opening 423 to expose a portion of the tape twisting mechanism adjacent throat 415' of slot 415 and an enlarged, irregularly shaped rear slot 424 to expose a portion of the packet arm mechanism. Likewise, flange 416 is cut away at 425 (FIG. 14) and top wall 418 is cut away at 426 to expose portions of the tape cutting and twisting structure, while rear wall 419 is cut away at 427 (FIG. 13) for passage of tape t and its feeding structure.

Packer Arm Mechanism

The packer arm mechanism, which is designed to gather or pack the upper end of closed filled bag b into the throat formed by matching portions 406', 415' of slots 405 and 415 respectively, for the tying operation, is illustrated in FIGS. 12-14 and 16. As shown in FIG. 12, such mechanism includes a solid and generally wing-shaped packer arm 428 having upper and lower sides 429 connected by a peripheral end wall 430, with the upper end of packer arm 428 being fixed on a vertical rocker shaft 431, (FIG. 13) extending upwardly through platform 401 and rotatably mounted in a sleeve 432 depending downwardly from such platform. To the lower end of shaft 431 is fixed one end of a link or crank 433 (FIG. 16), the opposite end of which is adapted to actuate one-way limit switch 505 (but only during clockwise movement, as will be described below), for controlling the operation of the clamping and swinging mechanisms of bag holding device 300, and on its left side crank 433 is provided with a flange 434 adapted to actuate two-way air valve 666 suitably mounted to the underside of platform 401, for controlling the operation of the tape twisting mechanism. Pivotally connected to such crank 433 is the piston rod 435 of a double acting air motor 436, the opposite end of which is pivotally mounted by means of a collar 437 on a bolt 438 extending downwardly through platform 401.

Continuing with FIGS. 12-14, packer arm 428 is provided adjacent its inner or leading, concave side with a longitudinal through slot 439 for passage of tape t, which may be of any suitable construction, but preferably is composed of a wire (not shown) embedded in a plastic ribbon. In such concave side, packer arm 428 is provided with a generally spade-shaped slot 440 which is designed to gather the upper end of the closed filled bag b into the entrance slot throat formed by portions 406' and 415' to facilitate the tying operation. Just to the right of slot 440 is a relatively narrow and deep, blade-receiving slot 441 for the tape cutting operation. At its right or pivot end, packer arm 428 is provided with an elongated outstanding tab or flange 442 which acts as a guide for the passage of tape t through the packer arm, and on its right rear side, packer arm 428 is provided with an adjustable screw 443 for actuating two-way valve 662 suitably mounted on platform 401 for controlling the operation of the tape feeding mechanism.

As shown in FIG. 12, packer arm 428 is illustrated in solid lines in its inoperative position against resilient stop 414 with tape t extending through the packer arm prior to the cutting and tying operations. As packer arm 428 moves to its operative, dotted line position, its outer or free end engages suitable stop 444 mounted on platform 401 for such cutting and tying operations.

Tape Cutting Structure

The tape cutting structure is shown in FIG. 12 as being composed of an L-shaped bracket 445 suitably secured by bolts to platform 401, with its upstanding flange portion being provided with an elongated knife 446 adapted to enter packer arm slot 441. Thus, it severs tape t as soon as packer arm 428 reaches its dotted line operative position engaging stop 444.

Tape Feeding Mechanism

The tape feeding mechanism is shown in FIGS. 12-15, and includes a reel 447 rotatably mounted on a post or spindle 448 extending upwardly from platform 401, with tape t passing from reel 447 through an elongated guide 449 suitably mounted on platform 401, whereupon the tape is engaged in the nip of bite between the two knurled rollers. Front roller 450 is suitably rotatably mounted on an elongated arm 451, the opposite or right end of which is suitably pivoted on platform 401 and is provided intermediate its ends with an outstanding transverse compression spring 452 engaging tab 409 for resiliently biasing roller 450 into engagement with tape t. Rear roller 453 likewise is rotatably mounted on platform 401, but is provided with a one-way clutch 454 (FIGS. 13 and 15) carrying an upper sprocket wheel 455 which is connected by endless link chain 456 with a right drive sprocket wheel 457 suitably rotatably mounted on platform 401. Fixed to chain 456 is a lug or extension 458 on piston rod 459 of a one-way, spring return, air motor 460 suitably mounted in cantilever fashion on platform 401 by means of bracket 461.

At this point, it is to be noted that tape t is only fed to packer arm 428 as the latter returns from its operative, dotted line position to its inoperative, solid line position of FIG. 12, because even though piston rod 459 of air motor 460 extends from right to left in FIG. 12 until it strikes adjustable stop screw 462 on tab 410, clutch mechanism 454 prevents rotation of rear feed roller 453. Hence, only upon retraction of piston rod 459 to the position shown in FIG. 12, is tape t fed through packer arm 428 in its inoperative solid line position, because clutch mechanism 454 now positively connects sprocket 455 and roller 453 to drive the latter in a clockwise direction, causing idler roller 450 to rotate in a counter-clockwise direction and so feed tape t.

Tape Twisting Mechanism

Tying device 400 is completed by the tape twisting mechanism illustrated in FIGS. 12, 12 and 15. The supporting structure for such tape twisting mechanism includes a front extension flange 463 on platform 401 to which is secured a depending front wall or bracket 464 (FIG. 15) which is connected to a rear end wall or bracket 465 depending downwardly from platform 401 by left and right side walls 466,467. The latter is provided with an upstanding bearing flange 468 projecting upwardly through slot 408 in platform 401, while left side wall 466 is provided with an outstanding bracket 468 terminating in upstanding bearing flange 470 likewise extending upwardly through slot 407 in platform 401. These bearing flanges rotatably support an elongated twister drive shaft 471 which is prevented from axial movement by a collar 472 adjacent flange 470 and a collar 473 adjacent flange 468. At its right end, twister drive shaft 471 is provided with a pinion 474 and at is left end with a tape twister head 475 (FIG. 12A) having oppositely extending curved peripheral hook portions 476 which catch and twist tape t, which has been cut to length and bellowed out behind the gathered bag in slot 440, as shown in dotted lines in FIG. 12.

Continuing with FIGS. 12 and 14, pinion 474 is driven by a large gear 477 having fixed on its left side or hub a sprocket wheel 478 for rotation therewith, such gear and sprocket assembly being rotatably mounted on a transverse shaft 479 suitably fixed in side walls 466,467, with such gear and sprocket assembly being held in the desired position by spacer sleeves 480 and 481 respectively. As shown in FIG. 15, a front sprocket wheel 482 is provided and is suitably rotatably mounted on a transverse shaft 483 also fixed in side wall 466,467. Sprocket wheel 482 is maintained in alinement with sprocket wheel 478 by suitable spacer sleeves (not shown) and is connected thereto by an endless link chain 484. To the lower side of this chain is fixed a lug or extension 485 on piston rod 486 of a one-way, spring return air motor 487 mounted in cantilever fashion in depending bracket 464, with the stroke of piston rod 486 being determined by a forwardly extending, adjustable stop screw 488 mounted in the rear end wall 465.

Hence, upon actuation of valve 666 by flange 434 (FIG. 16) when packer arm 428 is in its dotted line operative position of FIG. 12, piston rod 486 (FIG. 15) is suddenly extended under air pressure to drive chain 484 and large gear 477 (FIG. 14) counter-clockwise, whereupon pinion 474 and twister head 475 are rapidly rotated in the opposite direction (but also seen as counter-clockwise in FIG. 12A), because of the gear ratio, to twist and tie tape t. As packer arm 428 retracts to its solid line position of FIG. 12, valve 666 is reversed, connecting air motor 487 to exhaust, whereupon piston rod 486 slowly retracts to its FIG. 15 position under the influence of the spring (not shown) and the twister head reverses, while crank 433 actuates switch 505 (FIG. 16) to cause the tied bag b to be released and deposited on conveyor C (FIG. 28), as will be described in greater detail below.

Electrical Control System

Figure 29:
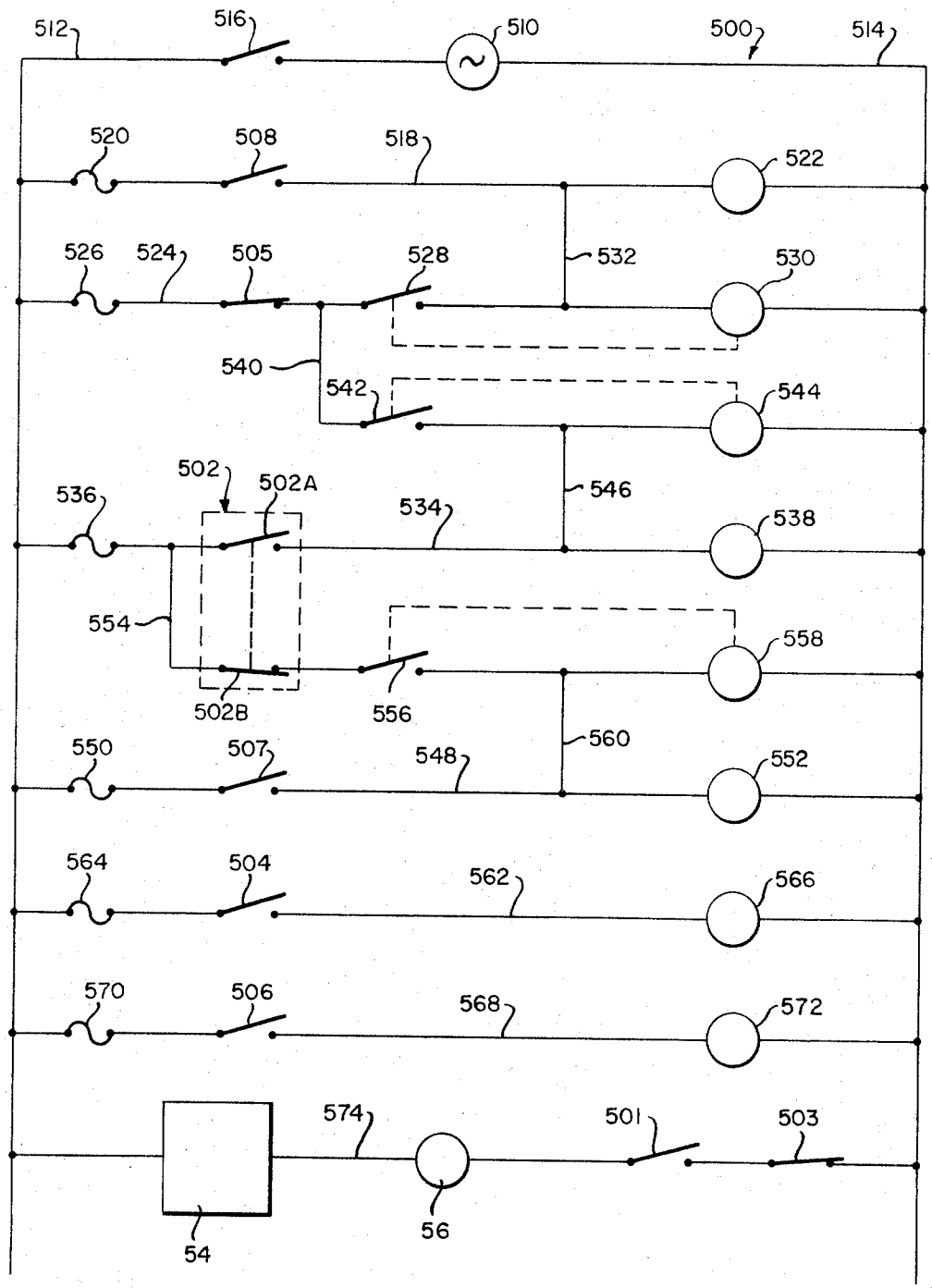
FIG. 29 is a schematic diagram of the electrical control system for the bagging machine.

Referring now to FIG. 29, the electrical control system for automatic bagging machine B is generally indicated at 500 and includes the aforementioned limit switches 501–508, of which 502, 505, 506 and 508 are of the one-way type (i.e. are actuated only by engagement with their roller carrying arms 502', 505', 506', and 508' from one direction, such arms being spring-biased to collapse when engaged from the opposite direction. In addition, switch 502 is double-acting s will be seen below.

In the schematic wiring diagram shown, a suitable 60 cycle, alternating current, 110 volt source is indicated at 510 as being connected across the input and output power lines 512, 514, and as provided with a suitable main on-off switch 516. The circuitry for controlling the operation of the clamping arm structure of bag holding device 300 includes a line 518 connecting the input and output lines and containing in series from left to right a fuse 520, normally open limit switch 508, and solenoid coil 522 for actuating valve 642 (FIG. 30) controlling the operation of lamp air motors 354,361 (FIG. 3). Another line 524 is connected across the input and output lines and includes in series from left to right, a fuse 526, normally closed limit switch 505, and the normally open switch or contact 528 mechanically controlled by latching relay coil 530. Such clamp control circuitry is completed by a shunt line 532 connected to line 518 between switch 508 and coil 522 and to line 524 between contact 528 and relay coil 530.

The circuitry for controlling the operation of the mechanism for swinging bag holding device 300 between bag feeding device 200 and bag tying device 400 includes line 534 connected across the input and output lines and containing in series from left to right a fuse 536, the normally open contact 502A of double-acting switch 502 and solenoid coil 538 for actuating valve 632 (FIG. 30) for controlling swinger air motor 331 (FIG. 3). This circuitry is connected to the clamp control circuitry by branch line 540 which is connected at its input end to line 524 between switch 505 and relay contact 528 and at its output end to output line 514. Line 540 includes in series from left to right the normally open contact 542 and latching relay coil 544 mechanically controlling such contact, with a shunt line 546 being connected to line 540 between relay contact 542 and coil 544 and to line 534 between switch contact 502A nd solenoid coil 538.

The circuitry for controlling operation of the bag spreading arm mechanism of bag holding device 300 includes line 548 connected across the input and output lines and including in series from left to right a fuse 550, normally open limit switch 507 and solenoid coil 552 for actuating valve 674 (FIG. 30) controlling spreader air motor 324 (FIG. 3). This spreading mechanism control circuit is tied in with the swinging mechanism control circuitry by branch line 554 which is connected at its input end to line 534 between fuse 536 and normally open contact 502A of double-acting switch 502 and at its output end to output line 514. Line 554 includes in series from left to right the normally closed contact 502B of switch 502 and the normally open contact 556 which is mechanically controlled by latching relay coil 558. A shunt line 560 completes such spreading mechanism control circuitry by being connected at one end to line 554 between relay contact 556 and its coil 558 and to line 548 between switch 507 and solenoid coil 552.

The circuit for controlling operation of the rocker arm mechanism of feeding device 200 includes a line 562 connected across the input and output lines and containing in series from left to right, a fuse 564, normally open limit switch 504 and solenoid coil 566 for actuating valve 622 (FIG. 30) for controlling rocker air motor 220 (FIG. 3).

The circuit for controlling the actuation of the packer arm mechanism of tying device 400 includes a line 568 connected across the input and output lines and contains in series from left to right a fuse 570, normally open limit switch 506 and solenoid coil 572 for actuating valve 652 (FIG. 30) controlling the packer arm actuating air motor 436 (FIG. 3).

The electrical control system is completed by a line 574 which is connected at its input end to the weighing machine electrical control circuitry schematically indicated at 54 and which may have its own source (not shown), but for convenience is shown as connected to input line 512. Line 574 contains in series from left to right solenoid coil 56 for actuating valve 48 (FIG. 2) which controls the operation of air motor 42 actuating gate 36 of weighing machine W, normally open limit switch 501, also mounted on the weighting machine as shown in FIG. 1, and actuated by switch engaging arm 321 on trailing spade 319 of bag holding device 300 (FIG. 3), as well as normally closed limit switch 503 mounted on bracket 138 of bag holding device 300 (FIG. 3). As will be explained in greater detail below, switches 501 and 503 act as safety switches to prevent tripping of gate 36 of weighing machine W, should bag b not be properly positioned on bagging machine B for receiving the produce.

Pneumatic Control System

Referring to FIG. 30, automatic bagging machine B is completed by the pneumatic control system generally indicated at 600. This system includes a suitable source of compressed air 602 which provides air pressure at say 160 lbs. psi to a main supply line 604 containing in series from left to right a main on-off valve 606 provided with a handle 608 for connecting the various air motors to supply 602 or for bleeding the line. Next in sequence are filter 610 and air pressure regulator 612 which reduces the operating pressure in main line 604 to 65 psi. Next in line is a tee 614 feeding an automatic oiler 616 which feeds, in turn, a series of tees connected to the following air motor control circuits.

The air circuit for controlling the operation of bag feeding device 200 includes tee 618 and branch line 620 leading to four-way valve 622 which is controlled by the rocker arm solenoid coil 566 (FIG. 29) and is connected to rocker arm air motor 220 by lines 624,626. Valve 622 has a throttled exhaust which acts as a time delay less than a second to maintain the rocker arm mechanism in its upper position (FIGS. 22,23) to ensure proper removal of bag b from bag feeding device 200 by bag holding device 300. Hence, even though valve 622 may be reversed upon spreading of bag b (FIG. 23), the rocker arm mechanism will not retract to its lower position (FIGS. 3 and 24) until bag b is completely removed therefrom, as will be described in greater detail below.

Next in series is the air circuit for controlling the operation of the swinging mechanism of bag holding device 300, and this includes tee 628 connected by line 630 with four-way valve 632 which is controlled by solenoid coil 538 (FIG. 29). Valve 632 is connected to swinger air motor 331 by lines 634,636.

The next air circuit serially connected to line 604 is that which controls the operation of the clamp actuating mechanism of bag holding device 300 and includes tee 638 connected by line 640 with four-way valve 642 controlled by solenoid coil 530 (FIG. 29). Valve 642, in turn, is connected to the trailing clamp arm air motor 352 by lines 644,646, while the leading clamp arm air motor 358 is connected in parallel to motor 352 by lines 645,647 forming extensions of lines 644,646 respectively. Hence, clamp control air motors 352,358 are simultaneously actuated by valve 642.

The air circuit for controlling the operation of the packer arm mechanism of bag tying device 400 includes tee 648 connected by line 650 to four-way valve 652 controlled by solenoid coil 572 (FIG. 29). This valve, in turn, is connected by lines 654,656 to air motor 436, and like valve 622 has a throttled exhause acting as a time delay of less than a second for maintaining packer arm 428 in its operative dotted line position of FIG. 12 until the twisting operation is completed, notwithstanding reversal of valve 652, as will be explained below.

Main air supply line 604 terminates in a tee 658 which feeds the air circuits for controlling both the tape feeding and tape twisting mechanism of tying device 400. The air control circuit for the tape feeding mechanism includes branch line 660 containing air switch or two-way valve 662 which is controlled by the packer arm mechanism either to supply air pressure to one-way, spring return air motor 460 or to cut off the supply and connect the motor to exhaust. Likewise, the air control circuit for the tape twisting mechanism includes branch line 664 containing air switch or two-way valve 666 which also is controlled by the packer arm mechanism either to supply air pressure to one-way, spring return air motor 487 or to cut off the supply and connect the motor to exhaust.

As shown in the upper left portion of FIG. 30, pneumatic control system 600 also includes air circuitry for controlling the operation of the spreading mechanism of bag holding device 300, as well as the flow of air through wicket bar or tube 208 to assist in opening each bag b prior to the bag spreading operation. Thus, leading from tee 614 is a branch line 668 containing air pressure regulator 669 which reduces the 65 lbs. psi pressure from main line 604 to a range between 20 and 40 psi which is adequate for operation of the following components. Downstream of regulator 669 is a tee 670 which feeds a branch supply line 672 leading to four-way valve 674 which is controlled by spreader solenoid coil 552 (FIG. 29), and is connected by lines 676,678 with air motor 324 controlling the operation of bag spreader arms 309,315 of bag holding mechanism 300 (FIG. 3). The exhaust from valve 674 is connected by line 680 with tee 682 which provides a surge of air to wicket bar 208 having perforations 209 to assist in opening bag b for the spreading operation, as will be explained in greater detail below. At the same time, branch line 668 leading from tee 670 is provided with a needle valve 684 for throttling continuous air flow through tee 682 to wicket bar 208, which also assists in opening bag b for the spreading operation.

The pneumatic control system 600 is completed by the circuit shown in the lower left hand portion of FIG. 30 and this includes a line 52 leading from valve 48 (FIG. 2) on weighing machine W to a needle valve 686 which throttles the air flow to one-way, spring return air motor 688. This air motor acts as a time delay device and is illustrated in FIG. 3 as being mounted on flange 135 of bracket 134, with its piston rod being provided with a head 690 for actuating one-way limit switch 502, but only on the down stroke, for controlling the operating cycle of automatic bagging machine B, to be described in detail below.

OPERATION

Summary of Cooperation Between Weighing Machine and Automatic Bagging Machine

Referring particularly to FIGS. 1 and 2, the operation of weighing machine W will be briefly reviewed in view of its inter-action with the operation of automatic bagging machine B. Produce (not shown) is fed in any suitable manner to supply conveyor 24 which at its upper left end feeds the produce over transfer plate 26 to both fast feed conveyor 28 and vibratory platform 30, with most of the produce being deposited onto conveyor 28 which supplies weighing conveyor 32 until it is slightly underweight, say by one pound or so. At this point, the lowered position of outrider 18 actuates weigher control circuitry 54 (FIG. 29) to stop fast feed conveyor 28 and energizes vibratory platform 30, which dribbles the produce onto weighing conveyor 32 until it reaches the predetermined weight desired. At this point, its electrical control circuitry 54 stops vibratory platform 30, and energizes solenoid coil 56 (FIG. 29) to actuate valve 48, air motor 42 and crank 40 to trip gate 36, thereby allowing the predetermined weight of produce to be deposited upon discharge conveyor 39 which delivers the produce to fill open bag b on automatic bagging machine B.

After a predetermined time interval sufficient to permit all of the produce on weighing conveyor 32 to be transferred to discharge conveyor 39, the time delay relay (not shown) in electrical control circuitry 54 deenergizes coil 56 to reverse valve 48 to return gate 36 to the upper restraining position shown, while simultaneously restarting fast feed conveyor 28. If for some reason, gate 36 is prevented from being tripped, as will be described below, the weigher control circuitry automatically stops supply conveyor 24 so as not be overload fast feed conveyor 28 and vibratory platform 30.

Obviously, weighing machine W is a complete entity in itself, and could be used to fill bags manually at the exit end of discharge conveyor 54 or in conjunction with another type of bagging machine. However, it is especially adapted for use with the inventive automatic bagging machine B, and hence both the electrical and pneumatic control systems of weighing machine W and inter-connected with those of automatic bagging machine B. Hence, the operation of the latter now will be described briefly as it relates to and as it is interconnected with that of the weighing machine, and with frequent reference to FIGS. 21–28.

As gate 36 of weighing machine W trips to unload the predetermined weight of produce, automatic bagging machine B actually is in the middle of its cycle, with bag holding device 300 being in the position shown in FIG. 23, wherein bag b has been fully spread or opened, with normally open limit switch 501 in lines 574 (FIG. 29) being closed by the extension 321 on trailing spade arm 319 to permit completion of the circuit and tripping of weigher gate 36. This action is caused by the spreading of bag b which creates sufficient tension to pivot the trailing spade arm slightly to the left of its FIG. 3 position so that extension 321 operatively engages switch contact arm 501'. On the other hand, if for some reason, bag b is not engaged over lower spade portions 312,320 (FIG. 3) the piston rod extension 328 of spreader air motor 324 extends to pivot leading bag spreader arm 309 to the right until hook arm 304 operatively engages contact arm 503' to open normally closed, safety limit switch 503 (FIGS. 3 and 29), thereby preventing tripping of weigher gate 36. In this connection it is to be noted that trailing spreader arm 315 remains stationary because the retracted swinging mechanism holds mounting bracket structure 301 stationary, including left sleeve 303 (FIG. 4) to which arm 315 is welded, while the right sleeve 303 to which arm 309 is welded swivels about the axis of bolt 305. It also is to be noted that switch 503 is so opened before the clamping mechanism is contracted by the downward movement of the rocker mechanism in closing switch 508, as will be explained below, in order to prevent completion of the circuit in line 574 through closing of switch 501 by engagement between trailing resilient clamping member 351 and the rear of trailing lower spade portion 320, which pivots trailing spade 319 in the same manner as if a bag were engaged over the spades. Hence, switch 501 prevents tripping of weigher gate 36 until bag b is properly stretched over the spades, and switch 503 prevents such tripping if no bag is engaged over the spades, even if switch 501 is later closed.

Assuming that bag b has been properly stretched over the spades (FIG. 23), switch 501 is closed to trip weigher gate 36. However, simultaneously the rocker mechanism moves down to contract the clamping mechanism and clamp bag b as shown in FIG. 24, so that the bag will be ready to receive the produce as shown in FIG. 25. At the same time, tripping of gate 36 supplies air pressure through line 52 (FIGS. 2, 3 and 30) and throttling needle valve 686 to one-way, spring return air motor 688 mounted on bracket 136 to extend the enlarged head 690 on its piston rod upwardly. In so doing, head 690 engages roller-carrying contact arm 502', but does not actuate one-way double-acting switch 502, because arm 502' merely collapses about its pivot and then springs back to the position shown as head 690 goes by. Thus, bag holding device 300 remains in the position of FIGS. 24 and 25 bag b is filled, which takes about a second.

Figure 26:
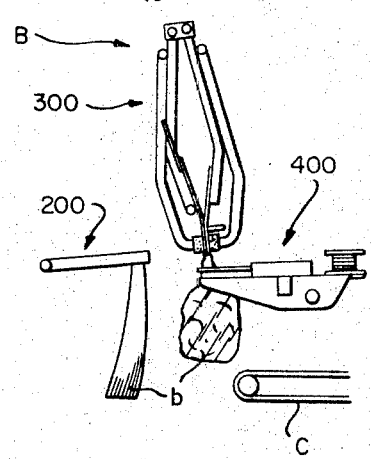
Figure 28:
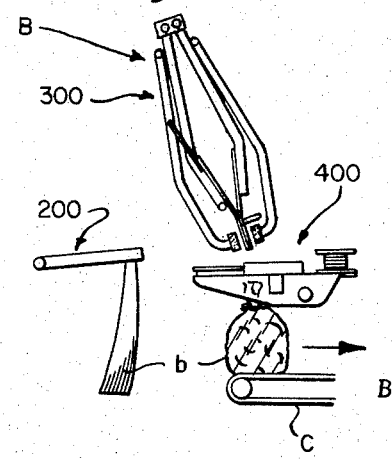

Upon reversal of valve 48 on weighing machine W (FIG. 2) air motor 688 is connected to exhaust through line 52 and throttle valve 686 whereupon piston rod head 690 is retracted downwardly by the spring return mechanism (not shown) of air motor 688 to operatively engage arm 502' and momentarily actuate double-acting switch 502 causing bag holding device 300 to complete its cycle, including the bag closing and swinging operations shown in FIG. 26, with the filled bag being tied as shown in FIG. 27 by the tying device 400 and finally released by the bag holding device 300 as shown in FIG. 28, whereupon the released bag drops through tying device 400 to a conveyor C or the like, with bag holding mechanism 300 returning to the start position shown in FIG. 21. Next, bag feeding device 200 is actuated to partially open and mount the next bag b over the spades of bag holding device 300 as shown in FIG. 22, which holding device is then actuated to spread bag b to the completely open position of FIG. 23, followed by actuation of the clamping mechanism to clamp the bag in the open position of FIG. 24, prior to being filled as shown in FIG. 25.

While automatic bagging machine B thus completes one cycle, following the bag filling operation and starts its next cycle prior to the next bag filling operation, weighing machine W is operating to ready weighing conveyor 32 (FIG. 2) for tripping of gate 36 for such filling operation. Hence, while each cycle of weighing machine W begins with the return of gate 36 to the restraining position and ends upon tripping of such gate for discharging the predetermined weight of produce to automatic bagging machine B, the latter begins and ends each cycle with actuation of switch 504 (FIG. 3) with the bag feeding device 200, bag holding device 300 and bag tying device 400 in the positions shown in FIGS. 3 and 21, while pausing in the middle of its cycle so that these aforesaid mechanisms assume the positions of FIGS. 24 and 25 for the bag filling operation following tripping of weigher gate 36. Only after weigher gate 36 returns to the restraining position of FIG. 2 does time delay motor 688 actuate switch 502 to cause bagging machine B to resume and complete its cycle.

Complete Cycle of Automatic Bagging Machine

For the purpose of the following detailed description of its complete operating cycle, bagging machine B will be assumed to be in the position shown in FIGS. 3 and 21 prior to start of the bag feeding operation.

Referring now to FIG. 29, the schematic circuit diagram is illustrated with the power off and air supply off. When main on-off switch 116 is closed, and main on-off valve 606 is opened by moving handle 608 to the position shown in FIG. 30, piston rod 333 of swinger air motor 331 (FIG. 3) is retracted with flange 335 engaging stop 142 and hook member 304 closing normally open limit switch 504, as shown in FIG. 3, to allow current to flow through line 562 (FIG. 29) and thereby energize solenoid coil 566 actuating four-way valve 622 (FIG. 30) to supply air pressure through line 624 to rocker air motor 220, thereby extending its piston rod extension 216 to pivot rocker arms 204 upwardly from the position shown in FIGS. 3 and 21 to the position shown in FIG. 22. As this movement occurs the continuous flow of air through openings 209 in wicket bar 208 (FIGS. 5, 8A and 30) partially opens the upper end of bag b by bellowing out the shorter front side b1 so that the upper end of the bag is fitted over collapsed lower spade portions 312, 320, with the longer rear side b2 (FIG. 27) of bag b, still being retained by wicket bar 208 on rods 224, the wicket bar clearing the trailing lower spade portion 320 as it moves upwardly.

As rocker arms 204 so rise, the rear rocker arm 204 (FIG. 11) operatively engages contact arm 507' to close normally open limit switch 507 (FIGS. 3 and 29), thereby completing the circuit through line 548 to energize solenoid coil 552 which actuates four-way air valve 674 (FIG. 30) to supply air pressure to spreader air motor 324 through line 676, thereby causing piston rod 328 to extend to the right and move leading spreader arm 309 from its collapsed position of FIGS. 3 and 22 to its spread position of FIG. 23. As this occurs, the exhaust from valve 674 provides a surge of air through lines 680 and 668 to wicket bar 208 to assist in opening bag b. As a consequence, bag b is stretched to the fully open position with the upper portion of its rear side b2 (FIG. 7) being torn off wicket bar 208, it being a simple matter to tear through holes b3 to the upper edge of the rear side b2 of bag b.

While lug 205 on rear rocker arm 204 (FIG. 9) also momentarily engages contact arm 508' of one-way switch 508 on the up stroke from lower stop 157 to the upper stop 160, arm 508' merely collapses and then springs back to the position shown without actuating switch 508. At the same time, as shown in FIG. 29, the closing of limit switch 507 latches the spreader control circuitry as current also flows through line 560 to line 554 and thereby energizes latching relay coil 558 which mechanically closes its contact 556 so that current is maintained through line 554 through normally closed contact 502B of double-acting switch 502, even following reopening of switch 507 as rocker arms 204 are caused to return from their upper position shown in FIGS. 22 and 23 to their lower position of FIG. 24, as explained below.

During spreading of bag b, right hand sleeve 303 (FIG. 4) of leading spreader arm 309 pivots about the axis of bolt 305, causing hook arm 304 to move out of operative engagement with arm 504' and thereby reopen limit switch 504 (FIG. 3). As this occurs, the current in line 562 of FIG. 29 is interrupted to deenergize solenoid coil 566, thereby reversing rocker arm control valve 622, (FIG. 30) to supply air pressure to the upper end of rocker arm motor 220 through line 626 retract its piston rod 218 and thereby lower rocker arms 204 from the position shown in FIG. 23 to the position shown in FIG. 24. However, valve 686 has a throttled exhaust which delays the lowering of rocker arms 204 momentarily so that they hold their upper position until bag b is clear of wicket bar 208, as shown in FIG. 23. As rocker arms 204 descend, lug 205 (FIG. 9) on the rear rocker arm operatively engages arm 508' and momentarily closes normally open one-way switch 508 as it goes by. Hence, as shown in FIGS. 29 and 30, upon such momentary closing of switch 508, current flows through line 518 to solenoid coil 552 which actuates four-way valve 642 simultaneously supplying air pressure to air motors 354, 361 through lines 644,645, thereby causing the cylinder of air motor 352 to retract over piston rod 355 (FIG. 19) and piston rod 362 (FIG. 20) to retract into the cylinder of air motor 358. Thus, clamp arms 336,346 are contracted from their open or spread apart positions of FIG. 23 to their clamping positions of FIG. 24, firmly engaging the outer sides of bag b.

At the same time, the clamp control circuitry is latched upon such momentary closing of switch 508 in the following manner, as shown in FIG. 29. Current flows through line 518 and line 532 to line 524, thereby energizing latching relay coil 530 which mechanically closes its normally open contact 528 to maintain current flow in line 524 through normally closed switch 505 and through lines 532 and 518 to valve control solenoid coil 522 following return of switch 508 to its normally open position.

As set forth above, with bag b positioned and fully stretched over the spread apart lower spade portions 312,320, as shown in FIG. 23, trailing spade 319 is pivoted slightly to the left by the bag tension so that its upper extension arm 321 closes switch 501 (FIGS. 1, 3 and 29) to enable the current flowing in line 574 to energize solenoid coil 56 controlling the actuation of four-way valve 48 on weighing machine W in FIG. 1 to trip gate 36. At about the same time as gate 36 trips, switch 508 is closed to contract clamp arms 336,346 so that bag b is securely clamped before any of the produce reaches the bag, as shown in FIG. 24. Simultaneously with tripping of gate 36 piston rod head 690 (FIG. 3) extends upwardly, bypassing double-acting switch 502 and by the time the produce has cleared gate 36, the latter returns to the restraining position of FIG. 2, reversing valve 48 and cutting off the air supply to air motor 688. However, needle valve 686 (FIG. 30) has a throttled exhaust so that the spring-actuated retraction of piston rod head 690 (FIG. 3) is momentarily delayed to permit all of the weighed produce to enter bag b (FIG. 25) before descending head 690 operatively engages arm 502' (FIG. 3) to momentarily actuate switch 502 as it passes by. As shown in FIG. 29, double-acting switch 502 includes normally opened contact 502A and normally closed contact 502B which are ganged together so that upon opening of one the other is closed. Hence, upon momentary actuation of switch 502 by descending piston rod head 690, normally open contact 502A is closed, allowing current to flow through line 534 to energize solenoid coil 538 which actuates four-way swinger valve 632 (FIG. 30) supplying air under pressure through line 634 to swinger control air motor 331, thereby causing its piston rod 333 (FIG. 3) to extend and pivot the entire bag holding mechanism mounted on bracket 301 (FIG. 4) from the position shown in FIG. 25 to that shown in FIG. 27. At the same time, momentary closing of contact 502A latches the electrical swinger control circuitry through lines 534, 546 and 540 to energize latching relay coil 544 which mechanically closes its contact 542, thereby maintaining current flow through such closed contact to both relay coil 544 and solenoid coil 538 to continue the swinging movement.

Simultaneously with the momentary closing of contact 502A, normally closed contact 502B is momentarily opened to unlatch the spreader control circuitry, breading the current flow in line 554 to deenergize latching relay coil 558, thereby opening its contact 556. This also deenergizes spreader control solenoid coil 552 which reverses four-way valve 674 (FIG. 30) and spreader air motor 324 to retract its piston rod 328 (FIG. 3) and thereby contract or collapse spade arms 309, 315. At the same time, inasmuch as the clamp control circuitry is still latched, clamp arms 336,346 continue to contract with spreader arms 309,315, in order to maintain the now closed bag on the lower portions 312,320 of spades 311,319, as bag holding device 300 swings into tying device 400, as shown in FIG. 26.

Just before bag holding device 300 reaches the position shown in FIG. 27, wherein it is fully positioned within tying device 400, the rearwardly extending rod 341 on bracket 340 of leading clamp arm 336 (FIGS. 3 and 19) operatively engages contact arm 506' and momentarily closes normally open, one-way switch 506 as it swings by, with such swinging movement being terminated in the FIG. 27 position by engagement between flange 339 on clamp arm 336 and stop 122 (FIG. 3). Hence, as shown in FIG. 29, momentary closing of switch 506 completes the circuit through line 568 to solenoid coil 572 which actuates four-way valve 652 (FIG. 30) to supply air pressure through line 654 to packer arm control air motor 436, and thereby extends its piston rod 435 (FIG. 13) to the left. This causes packer arm 428 to pivot from its inoperative solid line position of FIG. 12 to its operative dotted line position. Thus, the upper portion of closed filled bag b is gathered or packed into the slot 440 in packer arm 428 and the throat formed by portions 406' and 415' in platform 401 and cover plate 411 respectively, with the end portion of tape t cut by knife 446 being looped behind the bag in slot 440, all for the bag tying operation, as shown in FIG. 27.

Referring back to FIG. 12, as packer arm 428 moves from the solid to dotted line position, adjustable screw head 443 on the rear of the packer arm becomes disengaged from air switch 662 which admits air under pressure through branch line 660 to the right or rear end of one-way, spring return air motor 460, causing its piston rod 459 to extend from right to left until it engages stop 462. However, while chain 456 is advanced counterclockwise from right to left, clutch mechanism 454 is disengaged from roller 453 which remains stationary. Hence, tape t is not fed to packer arm 428.

Referring now to FIG. 16, as packer arm 428 moves from its solid to dotted line position of FIG. 12, crank 433 swings left with its outer end momentarily engaging and collapsing roller-carrying contact arm 505' of one-way limit switch 505, which is not actuated. However, upon completion of the leftward swing of crank 433, flange 434 thereon does operatively engage and actuate air switch 666 which, as shown in FIG. 30, supplies air under pressure through line 664 to twister mechanism control air motor 487, thereby extending its piston rod 486 (FIG. 15) to the right against stop 488. This action advances chain 484 to rotate sprocket wheel 478 in a counter-clockwise direction driving large gear 477 (FIG. 14) engaging pinion 474 to rapidly rotate shaft 471 and twister head 475 in a counter-clockwise direction, as shown in FIG. 12A. As a consequence, with cut tape t being looped behind the gathered or packed upper portion of bag b in slot 440 of packer arm 428, hooks 476 on twister head 475 engage and twist the free ends of cut tape t to complete the tying operation. This action occurs quite rapidly, in less than one-half second, because of the rapid rotation of head 475 caused by the gear ration between large gear 477 and pinion 474.

Inasmuch as limit switch 506 has been closed only momentarily, as noted above, solenoid coil 572 has already been deenergized to reverse packer arm control valve 652. However, such valve has a throttled exhaust which acts as a time delay sufficient to allow packer arm 428 to remain in its extended or operative, dotted line position of FIG. 12 until the bag tying operation is completed. At this time, valve 652 permits air under pressure to enter the left end of the cylinder of packer arm air motor 436 through line 656, retracting its piston rod 535, and thereby pivoting packer arm 428 to its retracted solid line position of FIG. 12.

Referring once again to FIG. 16, during retraction of piston rod 435 of air motor 436, flange 434 thereon is disengaged from air switch 666, which cuts off the air supply to twister head control air motor 487, and connects the same to exhaust, thereby permitting its spring return mechanism to retract piston rod 486 to the position shown in FIG. 15, to ready the twister mechanism for the next operation.

As crank 433 continues toward its FIG. 16 position, it operatively engages roller-carrying arm 505' to momentarily actuate one-way limit switch 505 as it passes by. Upon opening of this normally closed switch both the clamp and swinger control circuits of FIG. 29 are unlatched, as follows. Relay coil 530 is deenergized to open its contact 528 and solenoid coil 522 likewise is deenergized to reverse valve 642 (FIG. 30), thereby connecting lines 644,645 to exhaust while supplying air pressure through lines 646,647 to air motors 354,361 respectively to cause expansion and open clamp arms 336,346 as shown in FIG. 28, whereupon the filled and tied bag b is released and dropped through tying device 400 on to a suitable conveyor C or the like. Actually, since flange 339 on leading clamp arm 336 is engaging stop 122 (FIG. 3), spreader arms 309, 315 have swung back slightly left of their FIG. 27 position to initially separate the leading spade from the leading clamp for the desired release of bag b. However, this occurs instantaneously, because of the simultaneous unlatching of the swinger control circuit, as follows.

Referring once again to FIG. 29, the opening of switch 505 also deenergizes relay coil 544 to open its contact 542, thus breaking the circuit to solenoid coil 538 which reverses four-way valve 632 (FIG. 30) connecting line 634 to exhaust and line 636 to air pressure, thereby reversing swinger control air motor 331 to retract its piston rod 333 (FIG. 3) and swing bag holding mechanism 300 back from the position shown in FIG. 27 through the FIG. 28 position to the fully retracted position shown in FIG. 21. At this point it is to be noted that during return movement leading clamp arm rod 341 (FIG. 19) wipes and collapses switch arm 506' (FIG. 3) as it goes by, but switch 506 is not actuated and remains open, leaving packer arm 428 in its inoperative position.

Referring back to FIG. 12, as soon as packer arm 428 has returned to such inoperative, solid line position, the head of screw 443 once again engages air switch 662 (FIG. 30) which shuts off the air supply through line 660 and connects tape feed motor 460 to exhaust, permitting its return spring to retract piston rod 459 to the position of FIG. 12, thereby rotating sprocket wheel 455 and roller 453 clockwise through engaged clutch 454 and driving roller 450 counter-clockwise to feed tape t along guide 442 and through longitudinal slot 439 in retracted packer arm 428, all in order to make the same ready for the next tape cutting and twisting operations.

Referring once again to FIGS. 3 and 21, just before bag holding device 300 reaches the fully retracted position shown, hook arm 304 operatively engages roller-carrying arm 504' to close switch 504, thereby ending one complete cycle and initiating the next cycle with actuation of bag feeding device 200.

While the operation of automatic bagging machine B has been described above in connection with automatic weighing machine W, it is evident that bagging machine B is a complete entity in itself and could be employed with other weighing machines, such as those disclosed in the aforementioned patents, by properly juxtaposing the pivotal scoops thereof so as to empty into bag b, with switch 502 being actuated by raising of such scoops thereof following the bag filling operation to initiate the bag swinging and closing operations. Alternatively, weighing machine W could be provided with such a pivotal scoop at the end of discharge conveyor for like control of switch 502 to initiate the bag closing and swinging operations, or lever 40 could be employed to actuate switch 502 upon its return stroke, with its time delay being sufficient to permit filling of bag b prior to such switch actuation. Further, switch 502 could be manually actuated either by a foot or hand-operated control (not shown) following the bag filling operation.

However, the disclosed intercontrolled set up of weighing machine W and bagging machine B has definite advantages over the above alternative arrangements, as follows. First, the weighing operation is completely automatic as is the feeding of the produce to the bagging machine, the operation of which also is completely automatic, thereby eliminating the need for an operator for either completing the weighing operation or initiating either the bag filling operation or the bag closing and swinging operations. Secondly, the time delay built into the electrical control system of weighing machine W need only be sufficient for the produce to clear tripped gate 36 prior to reversal of valve 48 and return of gate 36 to the restraining position for initiating the next weighing cycle, there being no need for the gate to "wait" until the produce has entered bag b. Hence the cycle time of the weighing operation is reduced to the practical minimum. Thirdly, by having the tripping and return of gate 36 on weighing machine W control the operation of time delay air motor 688 on bagging machine B and actuation of switch 502 to initiate the bag closing and swinging operations, the bagging machine need only pause in its cycle long enough for the produce to clear gate 36 and enter bag b, which also reduces the overall bagging machine cycle to the practical minimum, thereby maximizing production.

What is claimed is:

1. An automatic bagging machine comprising support means, bag feeding means mounted on said support means, bag tying means mounted on said support means in opposed spaced relationship to said feeding means, bag holding means movably mounted on said support means between said feeding and tying means and including spreading means, clamping means and swinging means, and an electrical control system for actuating and deactuating said feeding, holding and tying means in timed sequence, said electrical control system including feeder control means energized by said holding means when moved to said feeding means by said swinging means to actuate said feeding means to partially open and feed the partially open end of an empty bag to said spreading means, spreader control means energized and latched by said actuated feeding means to actuate said spreading means to spread open and remove the bag from said feeding means and to deenergize said feeder control means and deactuate said feeding means, clamp control means energized and latched by said deactuated feeding means to actuate said clamping means to clamp the bag against said spreading means prior to the bag filling operation, dual swinger and closer control means simultaneously responsive to completion of such bag filling operation, with said closer control means being deenergized to unlatch said spreader control means and deactuate said spreading means while said clamping means remain actuated to collapse and close said filled bag, tyer control means energized by said holding means upon reaching said tying means to actuate said tying means to tie said closed and filled bag, and recycle control means deenergized by said tying means when the bag is tied to simultaneously unlatch said clamp control means and said swinger control means, thereby deactuating and opening said clamping means to release said tied bag, as well as deactuating said swinging means to move said holding means from said tying means to said feeding means for reenergizing said feeder control means.

2. The automatic bagging machine of claim 1 in combination with a weighing machine including chute means for delivering a predetermined weight of material to fill said open empty bag, weighing means including conveyor means for delivering said predetermined weight of material to said chute means, movable gate means for restraining said material in said weighing means until said predetermined weight is reached, and electrical control means for actuating said gate means upon said predetermined weight of material being reached to deliver the same to said chute means, for deactuating said gate means, and for simultaneously energizing and latching said swinger control means and deenergizing said closer control means upon completion of such bag filling operation.

3. The combination of claim 2 wherein said electrical control system of said automatic bagging machine includes enabling control means energized by said actuated spreading means upon said bag being spread open to enable said electrical control means of said weighing machine to actuate said gate means.

4. The combination of claim 3 wherein said electrical control system of said automatic bagging machine includes disabling control means deenergizable by said actuated spreading means in the event no bag is mounted thereon to prevent said electrical control means of said weighing machine from actuating said gate means notwithstanding subsequent energization of said enabling control means by said actuated clamping means.

5. The combination of claim 4 wherein said automatic bagging machine includes time delay means, and said electrical control means of said weighing machine automatically determines said predetermined weight of material, simultaneously actuates said gate means and said time delay means upon said predetermined weight of material being reached to deliver the same to said chute means, and simultaneously deactuates said gate means and time delay means upon such delivery to recycle the weighing operation without awaiting completion of the bag filling operation, but with said deactuated time delay means simultaneously energizing and latching said swinger control means and deenergizing said closer control means only upon completion of said bag filling operation following delivery of said predetermined weight of material to said open bag.

6. The combination of claim 5 wherein said enabling control means include normally open enabling switch means in circuit with said electrical control means of said weighing machine and closed by said actuated spreading means upon said bag being spread open, said disabling control means include normally closed disabling switch means in circuit with said enabling switch means and opened by said actuated spreading means in the event no bag is mounted thereon, and said time delay means include fluid motor means operatively associated with said dual swinger and closer control means and said electrical control means of said weighing machine.

7. The automatic bagging machine of claim 1 wherein said feeding means are mounted on said support means for movement toward and away from said holding means, and include means for partially opening an empty bag thereon.

8. The automatic bagging machine of claim 7 wherein said feeder control means include normally open switch means closed by said holding means, and solenoid means energized by said closed switch means for moving said feeding means toward said holding means to feed the partially opened empty bag over said deactuated spreading means.

9. The automatic bagging machine of claim 1 wherein said spreading means include spreader arm means mounted on said support means for movement relatively apart and together.

10. The automatic bagging machine of claim 9 wherein said spreader control means include normally open switch means closed by said actuated feeding means, solenoid means energized by said closed switch means for moving said spreader arm means relatively apart to spread open and remove the empty bag from said feeding means and to deactuate said feeding means, and relay means energized and latched by said closed switch means to maintain said solenoid means energized until said relay means is unlatched by said deenergized closer control means.

11. The automatic bagging machine of claim 1 wherein said clamping means include clamp arm means mounted on said spreading means for movement toward and away from said spreading means.

12. The automatic bagging machine of claim 11 wherein said clamp control means include normally open switch means closed by said deactuated feeding means, solenoid means energized by said closed switch means for moving said clamp arm means toward said spreading means to clamp the empty bag on said spreading means prior to the bag filling operation, and relay means energized and latched by said closed switch means to maintain said solenoid energized until said relay means is unlatched by said deenergized recycle control means.

13. The automatic bagging machine of claim 1 wherein said swinging means include means mounting said spreading means and clamping means on said support means for movement between said feeding means and tying means.

14. The automatic bagging machine of claim 13 wherein said swinger control means include normally open switch means closed upon completion of the bag filling operation, solenoid means energized by said closed switch means for moving said spreading means and clamping means from said feeding means to said tying means, and relay means energized and latched by said closed switch means to maintain said solenoid means energized until said relay means is unlatched by said deenergized recycle control means.

15. The automatic bagging machine of claim 1 wherein said spreading means include spreader arm means mounted on said support means for movement relatively apart and together, and said closer control means include normally closed switch means opened upon completion of the bag filling operation, solenoid means deenergized by said opened switch means for moving said spreader arm means relatively together while said clamping means remain actuated to collapse and close the filled bag, and relay means unlatched by said opened switch means to maintain said solenoid means deenergized until reenergized by reenergizing of said spreader control means.

16. The automatic bagging machine of claim 1 wherein said tyer control means include normally open switch means closed upon said holding means reaching said tying means, and solenoid means energized by said closed switch means for actuating said tying means.

17. The automatic bagging machine of claim 1 wherein said recycle control means include normally closed switch means in circuit with said clamp and swinger control means and opened by said tying means when the bag is tied to simultaneously unlatch said clamp and swinger control means.

18. The automatic bagging machine of claim 1 wherein said electrical control system includes enabling control means energized by said actuated spreading means upon the bag being spread open to enable said dual swinger and closer control means to be simultaneously energized and latched and deenergized respectively in response to completion of the bag filling operation.

19. The automatic bagging machine of claim 18 wherein said electrical control system includes disabling control means deenergized by said actuated spreading means in the event no bag is mounted thereon to prevent said dual swinger and closer control means from being simultaneously energized and latched and deenergized respectively in response to completion of the bag filling operation, notwithstanding subsequent energization of said enabling control means by said actuated clamping means.

20. The automatic bagging machine of claim 19 including time delay means actuated by said energized enabling control means in response to the start of the bag filling operation and deactuated in response to completion of the bag filling operation, with said deactuated time delay means simultaneously energizing and latching said swinger control means and deenergizing said closer control means.

21. The automatic bagging machine of claim 20 wherein said enabling control means include normally open enabling switch means closed by said actuated spreading means upon said bag being spread open, said disabling control means include normally closed disabling switch means in circuit with said enabling switch means and opened by said actuated spreading means in the event no bag is mounted thereon, and said time delay means include fluid motor means operatively associated with said dual swinger and closer control means and said enabling and disabling switch means.

22. The automatic bagging machine of claim 1 wherein said feeding means include rocker means pivotally mounted on said support means for vertical movement upwardly toward and downwardly away from said spreading means, mounting means operatively associated with said rocker means for suspending the trailing sides of an upright stack of bags and for feeding the bags one by one to said spreading means, means operatively associated with said rocker and mounting means for partially opening the leading side of the leading bag, fluid rocker motor means operatively associated with said support means and rocker means, and rocker valve means operatively associated with said rocker motor means and feeder control means.

23. The automatic bagging machine of claim 22 wherein said feeder control means include normally open rocker switch means on said support means and closed by said holding means, and rocker solenoid means energized by said closed rocker switch means and actuating said rocker valve means which actuates said rocker motor means which moves said rocker means upwardly into operative relationship with said spreading means to feed the partially open upper end of the leading bag over said deactuated spreading means.

24. The automatic bagging machine of claim 23 wherein said spreading means include leading and trailing spreader arm means pivotally mounted at their upper ends on said support means and terminating at their lower ends in depending leading and trailing spade means, fluid spreader motor means operatively associated with said leading and trailing spreader arm means for moving said leading spreader arm means toward and apart from said trailing spreader arm means, and spreader valve means operatively associated with said spreader motor means and spreader control means.

25. The automatic bagging machine of claim 24 wherein said spreader control means include normally open spreader switch means on said support means and closed by said actuated rocker means, spreader solenoid means energized by said closed spreader switch means and actuating said spreader valve means which actuates said spreader motor means which moves said leading spreader arm means apart from said trailing spreader arm means to spread open the empty bag on said leading and trailing spade means and remove the empty bag from said rocker means and to open said rocker switch means which deenergizes said rocker solenoid means which deactuates said rocker motor means which pivots said rocker means downwardly to open said spreader switch means and energize said clamp control means, and spreader relay means energized and latched by said closed spreader switch means to maintain said spreader solenoid means energized following opening of said spreader switch means by said rocker means until said spreader relay means is unlatched by said deenergized closer control means.

26. The automatic bagging machine of claim 25 wherein said clamping means include leading and trailing clamp arm means pivotally mounted at their upper ends of said leading and trailing spreader arm means respectively and terminating in leading and trailing clamp means, fluid clamp motor means operatively associated with said leading and trailing clamp arm means for moving the same toward and away from said leading and trailing spreader arm means, and clamp valve means operatively associated with said clamp motor means and clamp control means.

27. The automatic bagging machine of claim 26 wherein said clamp control means include normally open clamp switch means on said support means and momentarily closed by said downwardly pivoted rocker means, clamp solenoid means energized by said closed clamp switch means and actuating said clamp valve means which actuate said clamp motor means which move said leading and trailing clamp means toward said leading and trailing spade means to clamp both sides of the empty bag against said spade means, and clamp relay means energized and latched by said closed clamp switch means to maintain said clamp solenoid means energized following opening of said clamp switch means until said clamp relay means is unlatched by said deenergized recycle control means.

28. The automatic bagging machine of claim 27 wherein said swinging means include means pivotally mounting said leading and trailing spreader arm means on said support means, fluid swinger motor means operatively associated with said support means and said trailing spreader arm means for moving said spreading and clamping means between said feeding means and tying means, and swinger valve means operatively associated with said swinger motor means and swinger control means.

29. The automatic bagging machine of claim 28 wherein said swinger control means include normally open swinger switch means on said support means and momentarily closed in response to completion of the bag filling operation, swinger solenoid means energized by said closed swinger switch means and actuating said swinger valve means which actuates said swinger motor means which swings said spreading and clamping means from said feeding means to said tying means, and swinger relay means energized and latched by said closed swinger switch means to maintain said swinger solenoid means energized following opening of said swinger switch means until said swinger relay means is unlatched by said deenergized recycle control means.

30. The automatic bagging machine of claim 29 wherein said closer control means include normally closed closer switch means on said support means, ganged with said swinger switch means and momentarily opened in response to completion of the bag filling operation, said spreader solenoid means deenergized by said opened closer switch means and reversing said spreader valve means which deactuates said spreader motor means which moves said leading spreader arm means toward said trailing spreader arm means, while said clamping means remain actuated to collapse and close the upper end of the filled bag against said collapsed spade means, and said spreader relay means unlatched by said opened closer switch means to maintain said spreader solenoid means deenergized following closing of said closer switch means until said spreader relay means is reenergized and relatched by said reclosed spreader switch means.

31. The automatic bagging machine of claim 30 wherein said tying means include housing means having throat means, packer means mounted on said housing means for movement between operative and inoperative positions to gather the closed filled bag in said throat means and loop tape around such gathered bag in said operative position, tape feeding means on said housing means and actuated by said packer means in one of said positions to feed the tape to said packer means, tape cutting means on said housing means and operatively associated with said packer means in said operative position to cut the looped tape, and tape twisting means on said housing means and actuated by said packer means in said operative position to twist the cut looped tape and tie the gathered bag.

32. The automatic bagging machine of claim 31 wherein said tyer control means include normally open tyer switch means momentarily closed by said holding means upon reaching said tying means, and solenoid means momentarily energized by said closed tyer switch means and momentarily actuating said packer means to said operative position for the bag tying operation.

33. The automatic bagging machine of claim 32 wherein said recycle control means include normally closed recycle switch means on said housing means, in circuit with said clamp and swinger relay means and momentarily opened by one of said packer means and tape twisting means when the bag is tied to simultaneously unlatch said clamp and swinger relay means, thereby deenergizing said clamp solenoid means which reverse said clamp valve means which deactuate said clamp motor means which pivot said leading and trailing clamp arm means outwardly to release the tied bag, and deenergizing said swinger solenoid means which reverses said swinger valve means which pivots said holding means back from said tying means to said feeding means for reclosing said rocker switch means.

34. The automatic bagging machine of claim 33 wherein said electrical control system includes enabling control means energized by said actuated spreading means upon the empty bag being spread open to enable said ganged swinger switch means and closer switch means to be simultaneously momentarily closed and opened respectively in response to completion of the bag filling operation.

35. The automatic bagging machine of claim 34 wherein said electrical control system includes disabling control means deenergized by said actuated spreading means in the event no bag is mounted on said spade means to prevent said ganged swinger switch means and closer switch means from being momentarily closed and opened respectively in response to completion of the bag filling operation, notwithstanding subsequent closing of said enabling switch means by said actuated clamping means.

36. The automatic bagging machine of claim 35 including time delay means actuated by said energized enabling control means in response to the start of the bag filling operation and deactuated in response to completion of the bag filling operation, with said time delay means simultaneously momentarily closing and opening said ganged swinger switch means and closer switch means respectively.

37. The automatic bagging machine of claim 36 wherein said trailing spade means is pivoted on said trailing spreader arm means for limited movement, said enabling control means include normally open enabling switch means closed by said trailing spade means which is pivoted under bag tension upon the empty bag being spread open, said disabling control means include normally closed disabling switch means in circuit with said enabling switch means and opened by said actuated spreading means in the event no bag is mounted on said spade means, notwithstanding subsequent closing of said enabling switch means by said actuated trailing clamp means engaging and pivoting said trailing spade means, and said time delay means include fluid motor means operatively associated with said ganged swinger and closer switch means and said enabling and disabling switch means.

* * * * *